(12) United States Patent
Han et al.

(10) Patent No.: US 9,054,836 B2
(45) Date of Patent: *Jun. 9, 2015

(54) METHOD FOR ALLOCATING RESOURCE IN LTE SYSTEM

(71) Applicant: Samsung Electronics Co., Ltd., Suwon-si, Gyeonggi-do (KR)

(72) Inventors: Jin Kyu Han, Seoul (KR); Joon Young Cho, Suwon-si (KR); Ju Ho Lee, Suwon-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/161,345

(22) Filed: Jan. 22, 2014

(65) Prior Publication Data

US 2014/0140298 A1 May 22, 2014

Related U.S. Application Data

(63) Continuation of application No. 13/321,088, filed as application No. PCT/KR2010/003133 on May 18, 2010, now Pat. No. 8,634,368.

(30) Foreign Application Priority Data

May 18, 2009 (KR) ........................ 10-2009-0043019

(51) Int. Cl.
| | |
|---|---|
| *H04W 4/00* | (2009.01) |
| *H04L 5/00* | (2006.01) |
| *H04L 25/02* | (2006.01) |
| *H04W 72/04* | (2009.01) |
| *H04M 7/00* | (2006.01) |

(52) U.S. Cl.
CPC .............. *H04L 5/003* (2013.01); *H04L 5/0023* (2013.01); *H04L 5/0039* (2013.01); *H04L 5/006* (2013.01); *H04L 25/0222* (2013.01); *H04W 72/044* (2013.01); *H04M 7/006* (2013.01)

(58) Field of Classification Search
CPC ..... H04L 5/0023; H04L 5/003; H04L 5/0039; H04L 5/006; H04L 5/0222; H04L 5/0053; H04L 5/0048; H04M 7/006; H04W 72/044; H04W 72/042; H04B 7/0639; H04B 7/063
USPC ........ 370/281–338, 395.41, 395.43; 375/295; 455/450, 561
See application file for complete search history.

(56) References Cited

U.S. PATENT DOCUMENTS

| 8,634,368 B2 * | 1/2014 | Han et al. ........................ 370/329 |
| 2008/0045272 A1 * | 2/2008 | Wang et al. .................... 455/561 |

(Continued)

FOREIGN PATENT DOCUMENTS

| KR | 10-2008-0086317 A | 9/2008 |
| KR | 10-2008-0089493 A | 10/2008 |

*Primary Examiner* — Afsar M Qureshi
(74) *Attorney, Agent, or Firm* — Jefferson IP Law, LLP

(57) ABSTRACT

A fractional Resource Block (RB) allocation method which enables resource allocation in a unit smaller than RB to improve the capacity of Voice over Internet Protocol (VoIP) in a Long Term Evolution (LTE) system is provided. The method includes generating modulation symbols streams by performing channel coding and modulation on transport blocks corresponding to first and second data to be transmitted to respective users, multiplexing the modulation symbols stream alternately in unit of two continuous modulation symbols, and transmitting the multiplexed modulation symbol stream as mapped to corresponding resource. A resource arrangement method allows different users to share the same resource without using a Space Domain Multiple Access (SDMA) and indicates fractional RB allocation.

18 Claims, 23 Drawing Sheets

(56) References Cited

U.S. PATENT DOCUMENTS

| | | | |
|---|---|---|---|
| 2008/0069031 A1* | 3/2008 | Zhang et al. | 370/328 |
| 2010/0260137 A1* | 10/2010 | Vrzic et al. | 370/330 |
| 2010/0303034 A1* | 12/2010 | Chen et al. | 370/329 |
| 2011/0032895 A1* | 2/2011 | Englund et al. | 370/329 |
| 2011/0170629 A1* | 7/2011 | Lee et al. | 375/295 |
| 2012/0039298 A1 | 2/2012 | Lee et al. | |

* cited by examiner

METHOD FOR ALLOCATING RESOURCE IN LTE SYSTEM

CROSS-REFERENCE TO RELATED APPLICATION(S)

This application is a continuation application of a prior U.S. National Stage application Ser. No. 13/321,088, filed on Nov. 17, 2011, which claimed the benefit under 35 U.S.C. §371 of an International application filed on May 18, 2010 and assigned application number PCT/KR2010/003133, which claimed the benefit of a Korean patent application filed on May 18, 2009 in the Korean Intellectual Property Office and assigned Serial number 10-2009-0043019, the entire disclosure of which is hereby incorporated by reference.

BACKGROUND OF THE INVENTION

1. Field of the Invention

The present invention relates to a method for improving system throughput of service generating small amount of traffic such as VoIP (Voice over IP) in 3GPP LTE (3rd Generation Partnership Project Long Term Evolution) system.

2. Description of the Related Art

The mobile communication system has evolved into a high-speed, high-quality wireless packet data communication system to provide data services and multimedia services beyond the early voice-oriented services. Recently, various mobile communication standards, such as High Speed Downlink Packet Access (HSDPA) and High Speed Uplink Packet Access (HSUPA), both defined in $3^{rd}$ Generation Partnership Project (3GPP), High Rate Packet Data (HRPD) defined in $3^{rd}$ Generation Partnership Project-2 (3GPP2), and 802.16 defined in IEEE, have been developed to support the high-speed, high-quality wireless packet data communication services.

Such recent mobile communication systems adopt Adaptive Modulation and Coding (AMC) and channel sensitive techniques to improve transmission efficiency. With AMC, the transmitter can control the data amount according to channel state. That is, when the channel state is bad, the data rate is decreased to math a predetermined error rate, and when the channel state is good, the data transmission rate is increased to match another predetermined error rate. In this way, the mobile communication system can transmit large amount of information efficiently.

With the channel sensitive scheduling resource management method, the transmitter can serve the user having superior channel state first selectively among multiple users and thus increase system throughput as compared to the general channel allocation and serving method. For example, the AMC and channel sensitive scheduling are the techniques for using the most appropriate modulation and coding scheme at the most efficient timing based on the partial channel state information fed back by the receiver.

There has been many researches done to adopt Orthogonal Frequency Division Multiple Access (OFDMA) to next generation communication systems in place of Code Division Multiple Access (CDMA) that has been used in $2^{nd}$ and $3^{rd}$ Generation mobile communication systems. The standardization organizations such as 3GPP, 3GPP2, and IEEE are developing standards for enhanced system based on the OFDMA or modified OFDMA. It is known that OFDMA promises to increase system capacity as compared to CDMA. One of the factors affecting the increase of system capacity in an OFDMA system is the use of frequency domain scheduling. As the channel sensitive scheduling technique uses the time-varying channel for capacity gain, it is possible to increase the capacity gain with frequency-varying channel characteristic.

LTE adopts Orthogonal Frequency Division Multiplexing (OFDM) in Downlink (DL) and Single Carrier Frequency Division Multiple Access (SC-FDMA) that are both capable of scheduling in frequency domain.

The AMC and channel sensitive scheduling are the techniques that are capable of improving the transmission efficiency in the state where the transmitter has acquired information enough on the transmit channel. In FDD (Frequency Division Duplex) mode where the transmitter cannot estimate the state of the transmit channel based on the receive channel, it is designed for the receiver to report the information on the transmit channel to the transmitter. In case of TDD (Time Division Duplex) mode where the transmit channel state can be inferred from the receive channel state, the transmit channel state report from the receiver to the transmitter can be omitted.

Although the mobile communication system evolves to support high speed high quality radio packet data communication, voice communication is still one of the main services. VoIP (Voice over Internet Protocol) is the service for supporting efficient voice communication in the communication system designed for radio packet data communication. The voice communication service has a characteristic in that a certain amount of traffic takes place at a certain interval and very sensitive to delay. In case of the traffic not sensitive to time delay, the scheduler can schedule the data on appropriate radio resource with temporal margin so as to expect high gain with the AMC and channel sensitive scheduling. In case of the delay sensitive traffic, however, the scheduler has to schedule the data without enough temporal margin and, as a consequence, it is difficult to expect the large gain of channel sensitive scheduling. Also, if a certain amount of traffic takes place regularly, the AMC which changes the modulation and coding scheme depending on the data amount becomes useless. In such cases, the control signals for indicating the modulating and coding scheme that are transmitted by using the AMC and channel sensitive scheduling techniques causes consummation of relatively large amount of resource as compared to the data amount to be transmitted.

By taking notice of these features of VoIP, a new resource allocation scheme appropriate for VoIP, referred to as SPS (Semi-Persistent Scheduling), is defined in LTE. SPS is designed to prevent the control signal from being transmitted for every data transmission such that the resource is allocated automatically at the interval of the traffic occurrence with the initially configured modulation and coding scheme until a resource release signal is transmitted.

FIG. 1 is diagram illustrating a resource unit defined for downlink in a LTE system.

Referring to FIG. 1 LTE adopts OFDMA in downlink. The resource is allocated in unit of resource block (RB) 110. An RB 110 is generated from 12 subcarriers on frequency axis and a subframe on time axis. A subframe has 1 msec duration and consists of 14 OFDM symbols. 10 subframes constitute a radio frame.

The basic unit of radio resource is resource element (RE). An RE 112 is defined by one subcarrier on frequency axis, one OFDM symbol on time axis, and one virtual antenna port on spatial axis. This means that one RE carrier transmits a modulation signal. In case of allocating resource in unit of RE, too much information amount is required for indicating allocated resources and thus resource allocation is performed in unit of Resource Block (RB).

FIG. 2 is a diagram illustrating an RB composed of a plurality of REs arranged with different purposes in LTE downlink.

Referring to FIG. 2, an enhanced Node B (eNB) transmits predetermined reference signal (RS) at predetermined positions in an RB for channel estimation. A User Equipment (UE), which knows the position of the resource designated for the signal, estimates channel according to the received RB. Reference number 120 denote the RE used for common RS. FIG. 2 shows the RB configured with common RS in case that 4 antenna ports are used.

One RB consists of 168 (=12×14) REs and, when the number of transmit antennas is 4, 24 REs are assigned for common RSs. In order to indicate resource allocation, Physical Downlink Control Channel (PDCCH) is transmitted in n OFDM symbols duration at the beginning of a subframe which is referred to as control region 122. Here, n can be 1, 2, or 3. Since the control region consists of 3 OFDM symbols in the example of FIG. 2, n=3. The size of the control region can vary every subframe and indicated by Physical Control Format Indicator Channel (PCFICH) at the first OFDM symbol of each subframe.

In the control region 122, physical ARQ Indicator Channel (PHICH) carrying ACK/NACK signal for Physical Uplink Shared Channel (PUSCH) is defined to support HARQ process. That is, the control channel region carries RS, PDCCH, PCFICH, and PHICH. Reference number 124 denotes RE designated for control signal transmission. Reference number 126 denote RE designated for PUSCH transmission carrying scheduled user data.

PDSCH cannot be transmitted in the control region 122. Accordingly, in the exemplary case of FIG. 2 where the number of transmit antenna ports is 4 and the control region consists of three OFDM symbols, the number of REs that can be used for PDSCH transmission in an RB is 116.

Table 1 summarizes the number of REs available for PDSCH transmission in one RB according to the number of eNB's transmit antennas, whether the dedicated RS is defined, and length of the control region.

TABLE 1

| Condition | # of transmit antenna ports | Dedicated RS | Size of control region | Number of PDSCH REs |
|---|---|---|---|---|
| 1 | 1 | Not defined | 1 | 150 |
| 2 | 1 | Not defined | 2 | 138 |
| 3 | 1 | Not defined | 3 | 126 |
| 4 | 1 | Defined | 1 | 138 |
| 5 | 1 | Defined | 2 | 126 |
| 6 | 1 | Defined | 3 | 114 |
| 7 | 2 | Not defined | 1 | 144 |
| 8 | 2 | Not defined | 2 | 132 |
| 9 | 2 | Not defined | 3 | 120 |
| 10 | 2 | Defined | 1 | 132 |
| 11 | 2 | Defined | 2 | 120 |
| 12 | 2 | Defined | 3 | 108 |
| 13 | 4 | Not defined | 1 | 136 |
| 14 | 4 | Not defined | 2 | 128 |
| 15 | 4 | Not defined | 3 | 116 |
| 16 | 4 | Defined | 1 | 124 |
| 17 | 4 | Defined | 2 | 116 |
| 18 | 4 | Defined | 3 | 104 |

The number of REs determined which is by referencing Table 1 is available in case of using normal Cyclic Prefix (CP) and system bandwidth is greater than 10 RBs. This is because the number of OFDM symbols constituting a subframe using an extended CP decreases to 6 and the size of the control region is configured with 2, 3, or 4 rather than 1, 2, or 3 when the system bandwidth is equal to or less than 10 RBs.

Reference number 130 denotes a principle of frequency first mapping for PDSCH. The modulation symbols streams of PDSCH are arranged in ascending order direction of subcarrier indices on the frequency axis. Once all of the subcarriers in an OFDM symbol are assigned, and then subcarriers in next OFDM symbol are assigned for PDSCH resource.

In an RB, dedicated RS can be defined additionally. The dedicated RS means the RS, when beamforming is applied for a scheduled user, to which the same beamforming is applied as to the PDCCH. The dedicated RS is mapped to 12 REs per RB.

FIG. 3 is a block diagram illustrating a configuration of an eNB transmitter in a legacy LTE system.

FIG. 3 shows the configuration of normal eNB transmitter using spatial multiplexing (SM) in case of transmitting two codewords (CWs).

Transport Block (TB) denotes the information signal delivered from a higher layers to a physical layer to be transmitted through PDSCH. In case of supporting SM, up to two TBs can be transmitted on the same resource. Reference number 200a denotes TB1 for the first CW, and reference number 200b denotes TB2 for the second CW.

TB1 200a and TB2 200b channel coded by the channel coders 202a and 202b, scrambled by the scramblers 204a, 204b, and modulated by the modulators 206a and 206b so as to be converted to modulation signal streams. In case that no SM is used, TB1 200a does not exist such that the processes 202b, 204b, and 206b for TB1 200a are omitted.

The one or two modulation signal streams are converted to modulation signal streams per spatial layer to which precoding is applied by the precoder 210 through layer mapper 208. In case of SM the number of CWs is limited to 2 but four spatial layers are allowed and thus it is necessary to define the arrangement for this.

In case of using transmit diversity, the number of spatial layers is 2 or 4 while the number of CWs is 1, and precoding means the transmit diversity coding. The precoding can be categorized into one of transmit diversity coding, open-loop precoding, and closed-loop precoding.

The precoder 210 can converts the modulation signal streams per spatial layer to signal streams to be transmitted through respective transmission antenna ports 2116c and 216d. The precoded signal streams are mapped to REs corresponding to antenna ports by RE mappers 212c and 212d, converted to OFDM symbols by OFDM signal generator 214c and 214d, and then transmitted through respective antenna ports 216c and 216d. 1301 FIG. 4 is a diagram illustrating a resource unit defined in uplink of a legacy LTE system.

Referring to FIG. 4, LTE adopts SC-FDMA in uplink, and the basic unit of radio resource is RE as in downlink. An RB 400 is generated from 12 virtual subcarriers and one subframe on time axis. The subframe has 1 msec duration and consists of 14 OFDM symbols as in downlink. The RE 402 is defined by a virtual subcarrier in an SC-FDMA symbol.

SC-FDMA applies Discrete Fourier Transform as precoding at step prior to OFDM signal generation. Accordingly, the RE mapped designated for a modulation symbol does not means a subcarrier but is referred as virtual subcarrier. In case of allocating resource in unit of RE, too much information amount is required for indicating allocated resources and thus resource allocation is performed in unit of Resource Block (RB).

FIG. 5 is a diagram illustrating resource arrangement per purpose in an RB in uplink of legacy LTE.

Referring to FIG. 5, RS can be defined in unit of RE in SC-FDMA. Accordingly, a specific SC-FDMA symbol is entirely used for RS. The uplink RS is defined in the form of dedicated RS for per-user uplink channel estimation and used for demodulation so as to be referred to as Demodulation RS (DM RS).

Uplink Multi-User Multiple Input Multiple Output (MU-MIMO) means uplink Space Domain Multiple Access (SDMA). If the dedicated RSs that are orthogonal between user are received, the eNB receiver applies spatial filter appropriate for the per-user spatial channel response to discriminate among PUSCHs transmitted to different users.

The fourth and eleventh SC-FDMA symbols of a subframe 510 are SC-FDMA symbols 514 for transmitting the dedicated RS. By transmitting the per-user orthogonal signals as dedicated RS, it is possible to support uplink MU-MIMO. Other SC-FDMA symbols 516 are the resource available for PUSCH transmission. Among the total 168 (=14×12) RBs are defined in LTE uplink, the number of REs available for PUSCH transmission is 144 (12×12) with exception of resource assigned for RS.

In case of the subframe including Sounding RS (SRS) transmitted for uplink channel state at eNB, the last SC-FDMA symbol of a subframe is used for SRS transmission. Accordingly, the number of PUSCH REs is 132 (=11×12) per RB. Here, the number of REs is for a normal CP subframe. In case of using the extended CP, the number of SC-FDMA symbols constituting the subframe decreases and, as a consequence, the number of RE varies.

FIG. 6 is a block diagram illustrating a configuration of a UE transmitter in a legacy LTE system.

Referring to FIG. 6, the TB 620 is channel coded by a channel coder 622, scrambled by a scrambler 624, and modulated by a modulator 626, so as to be output as a modulation symbol stream. The modulation symbol stream is transform-precoded by a transform precoder 628 as DFT precoder, mapped to PUSCH RB by an RE mapper 630, and then converted to SC-FDMA signal by a SC-FDMA signal generator 632 to be transmitted through a UE transmit antenna 634.

FIG. 7 is a block diagram illustrating a configuration of an eNB receiver in a legacy LTE system.

Referring to FIG. 7, the signal received by the receive antenna 710 processed by a SC-FDMA signal receiver 712 and then RE-demapped by an RE demapper 714. In case that the eNB has multiple receive antennas, it is assumed that an antenna combiner is included in the SC-FDMA signal receiver 712. The signal separated to decode the DFT precoding applied at the UE for generating the SC-FDMA signal is processed by a transform-precoding decoder 716 as an Inverse DFT (IDFT), demodulated by a demodulator 718, descrambled by a descrambler 720, and channel-decoded by a channel decoder 722 so as to be recovered as the TB 724 transmitted by each user.

FIG. 8 is a diagram illustrating resource allocation according to channel state of UE in conventional system.

Referring to FIG. 8, two UEs 802 and 804 are connected to a eNB 800. The UE 804 is located close to the eNB 800 as compared to the UE 802 such that the average channel state of the UE 804 is superior to that of the UE 802.

If the channel response of UE 802 is good enough to apply a high order modulation and coding scheme, it is possible to allocate the resource small in amount to the UE 802 for transmitting the same data amount as the UE 804. For example, if the 16QAM (16 Quadrature Amplitude Modulation) is applied to the UE 802 while QPSK (Quadrature Phase Shift Keying) to the UE 804, the PDSCH or PUSCH for UE 802 carries 4 coded bits per RE while the PDSCH or PUSCH for UE 802 carries 2 coded bits per RE. If the same channel coding is applied and the same data amount is transmitted, the UE 804 needs only half of the resource allocated to the UE 804.

DISCLOSURE OF INVENTION

Technical Problem

The LTE system composed of an UE having a good channel quality and an eNB is capable of reducing the resource amount to be less than an RB for providing a service generating small amount of traffic regularly such as VoIP. However, there is no resource allocation in unit less than an RB in LTE. The reason is because the use of smaller resource allocation causes the more control signal overhead for indicating the allocated resource. In order to solve this problem, many researches are being conducted.

The present invention proposes a fractional RB allocation method that is capable of allocating the resource in unit smaller than an RB, resulting in improvement of VoIP capacity in LTE system. Also, the present invention introduces a method for resource mapping to enable different users to share the same resource without using SDMA and indicating fractional RB allocation. It is an object of the present invention to improve VoIP capacity by reducing the resource amount occupied by the UEs having good channel quality.

Solution to Problem

In order to solve the above problems, the resource allocation method of the present invention includes generating modulation symbols streams by performing channel coding and modulation on transport blocks corresponding to first and second data to be transmitted to respective users; multiplexing the modulation symbols stream alternately in unit of two continuous modulation symbols; and transmitting the multiplexed modulation symbol stream as mapped to corresponding resource.

Advantageous Effects

According to the present invention, it is allowed to allocate resource in unit smaller than an RB for delay sensitive service such as VoIP generating a small amount of traffic at a certain interval, resulting in increase of capacity of service such as VoIP.

DETAILED DESCRIPTION OF EXEMPLARY EMBODIMENTS

Exemplary embodiments of the present invention are described with reference to the accompanying drawings in detail. The same reference numbers are used throughout the drawings to refer to the same or like parts. Detailed description of well-known functions and structures incorporated herein may be omitted to avoid obscuring the subject matter of the present invention.

Terms and words used in the specification and claims must be regarded as concepts selected by the inventor as the best method of illustrating the present invention, and must be interpreted as having meanings and concepts adapted to the scope and sprit of the present invention to understand the technology of the present invention.

Figure 1:
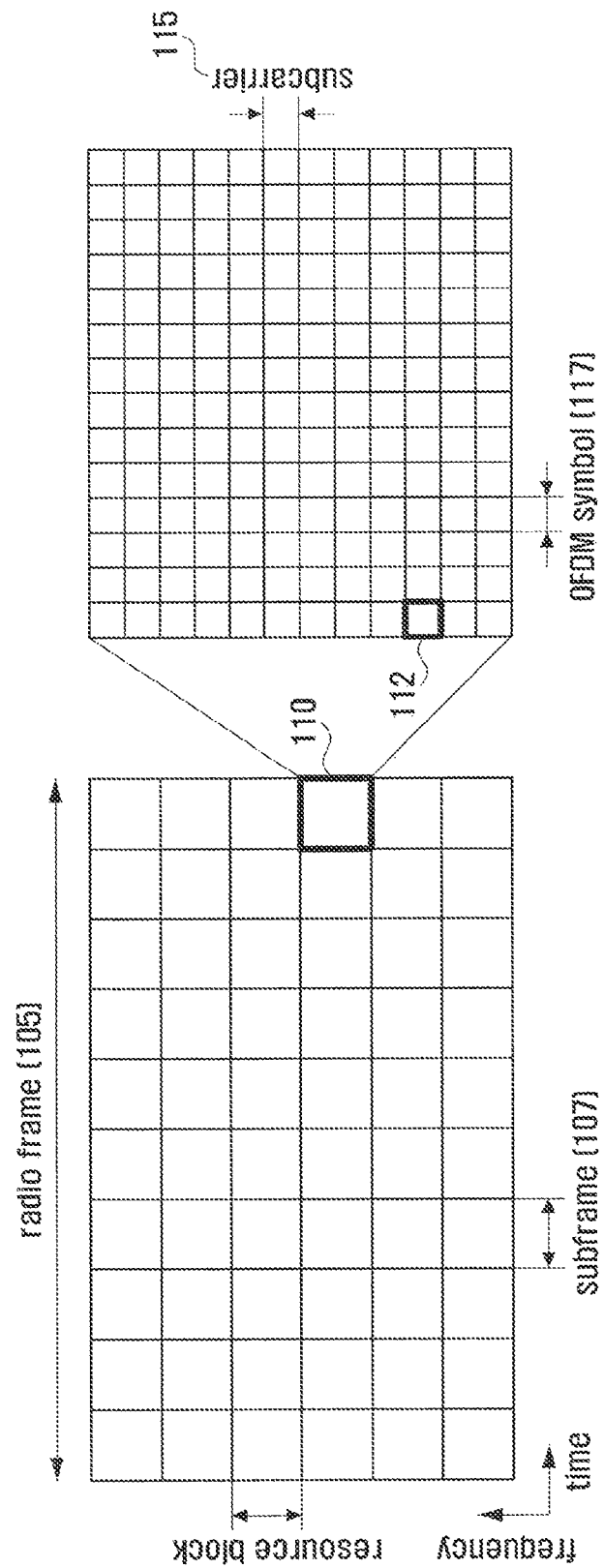
FIG. 1 is diagram illustrating a resource unit defined for downlink in a LTE system.
Figure 2:
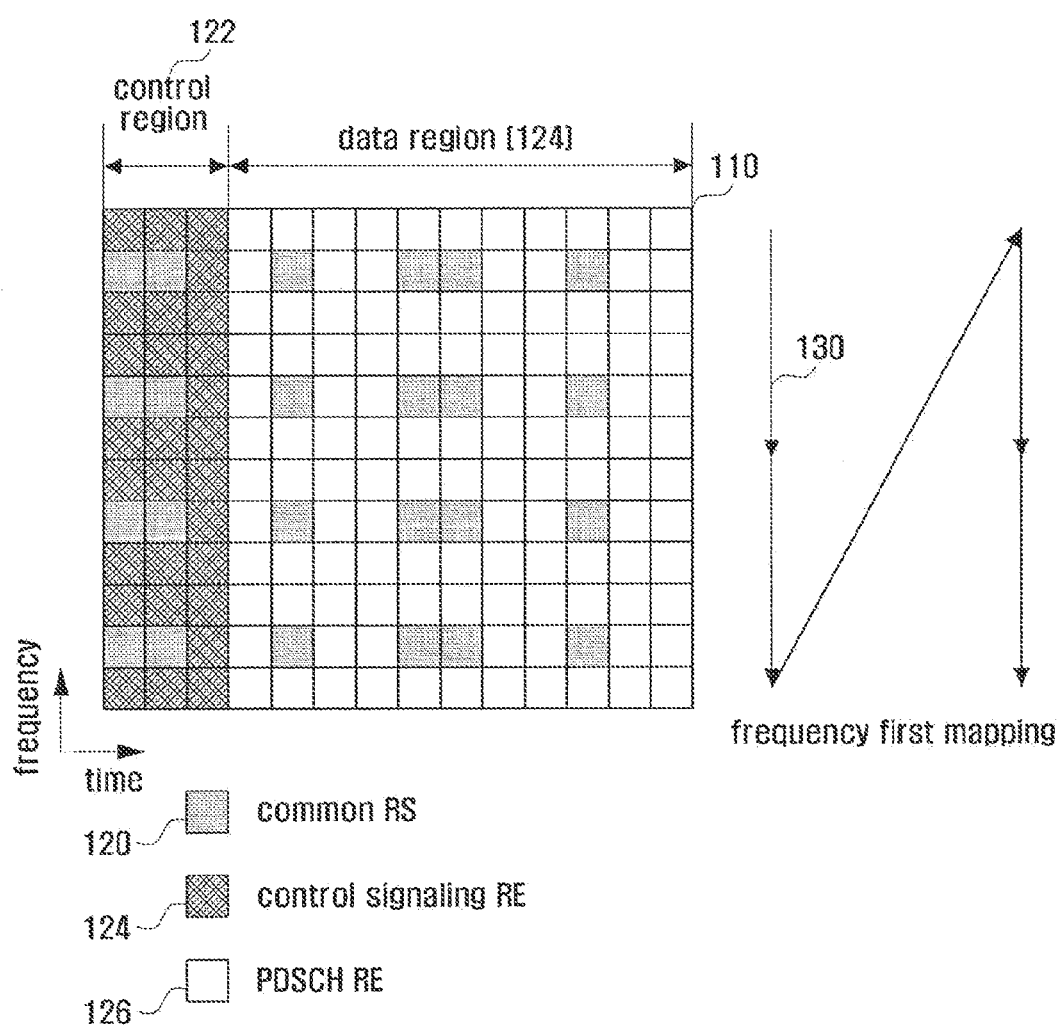
FIG. 2 is a diagram illustrating an RB composed of a plurality of REs arranged with different purposes in LTE downlink.
Figure 3:
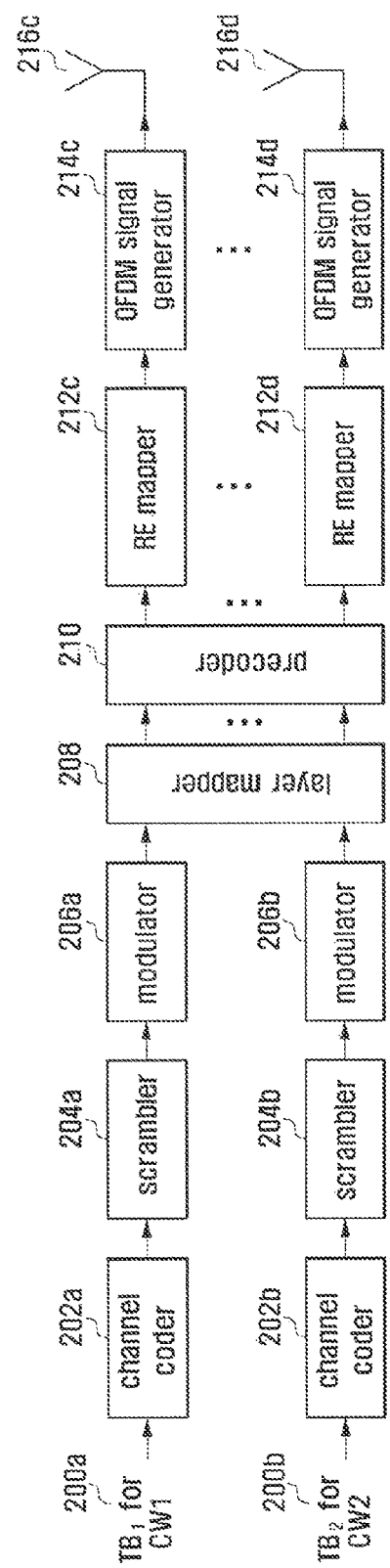
FIG. 3 is a block diagram illustrating a configuration of an eNB transmitter in a legacy LTE system.
Figure 4:
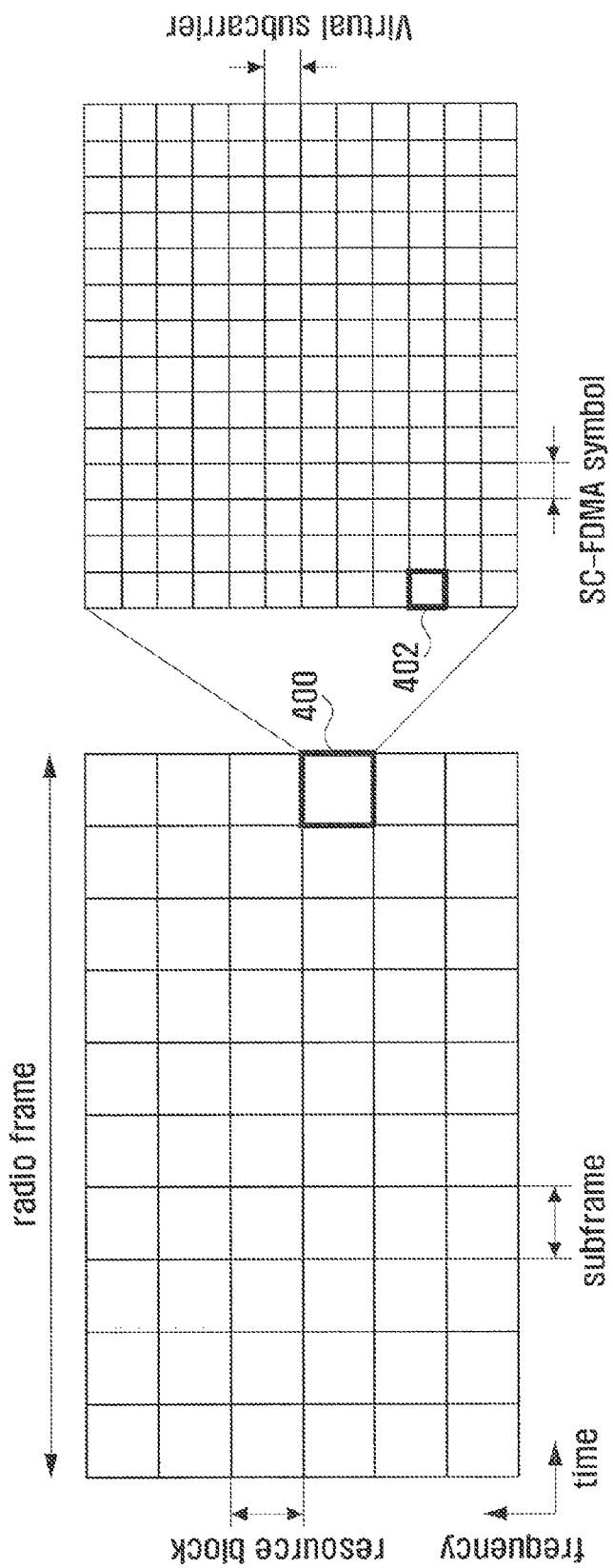
FIG. 4 is a diagram illustrating a resource unit defined in uplink of a legacy LTE system.
Figure 5:
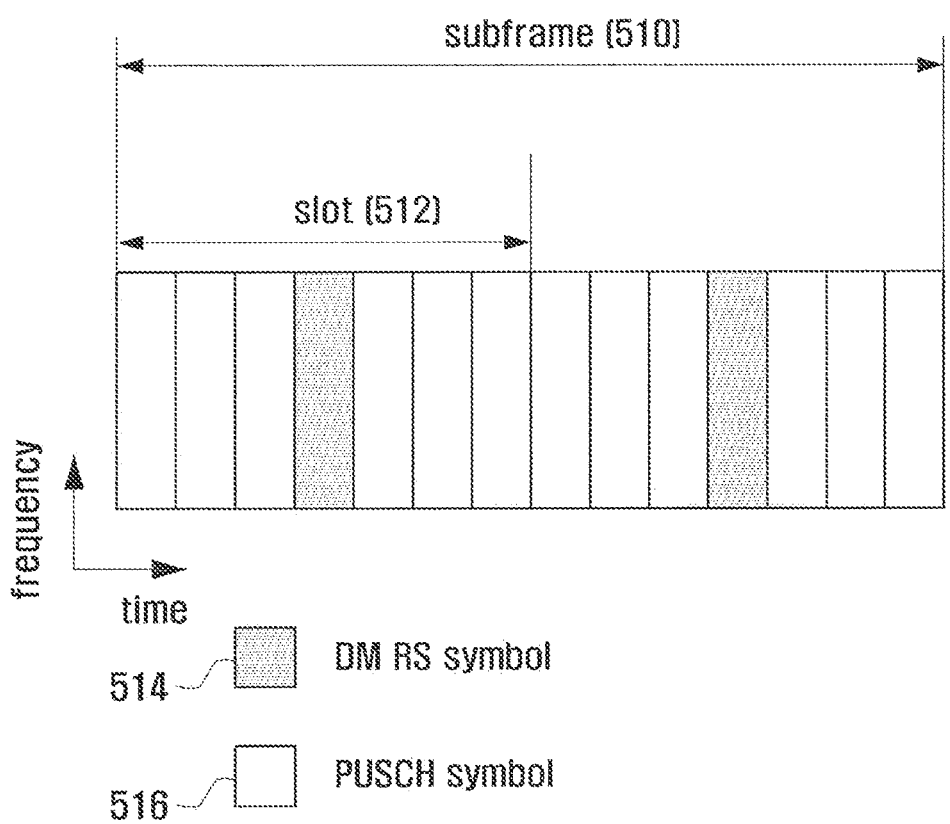
FIG. 5 is a diagram illustrating resource arrangement per purpose in an RB in uplink of legacy LTE.
Figure 6:
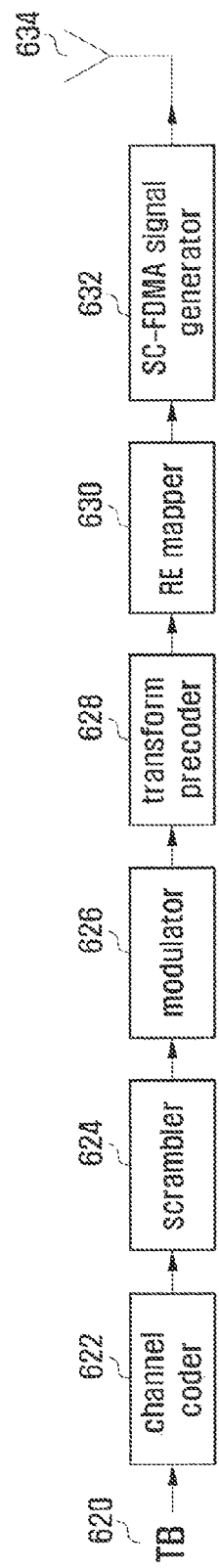
FIG. 6 is a block diagram illustrating a configuration of a UE transmitter in a legacy LTE system.
Figure 7:
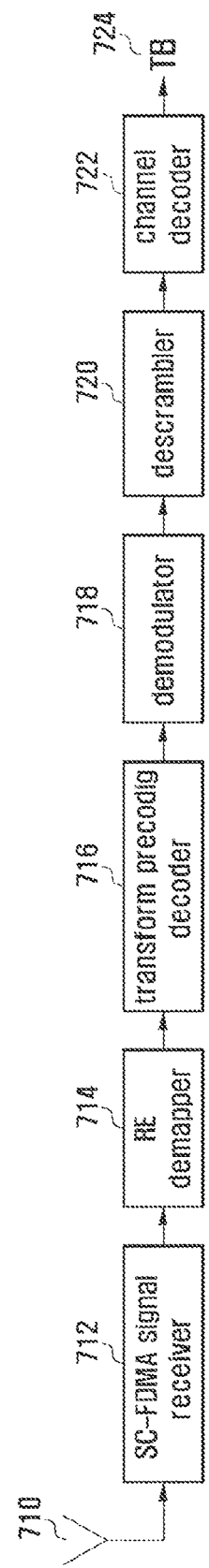
FIG. 7 is a block diagram illustrating a configuration of an eNB receiver in a legacy LTE system.
Figure 8:
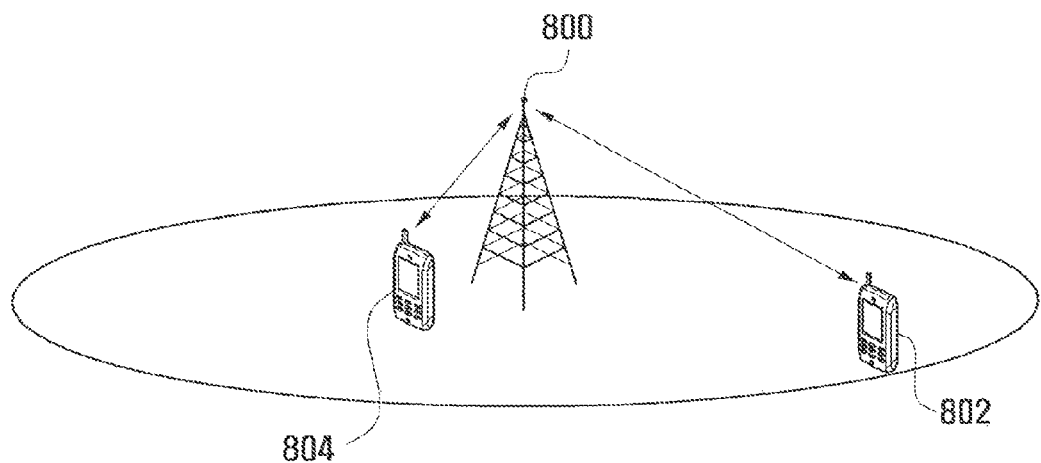
FIG. 8 is a diagram illustrating resource allocation according to channel state of UE in conventional system.
Figure 9:
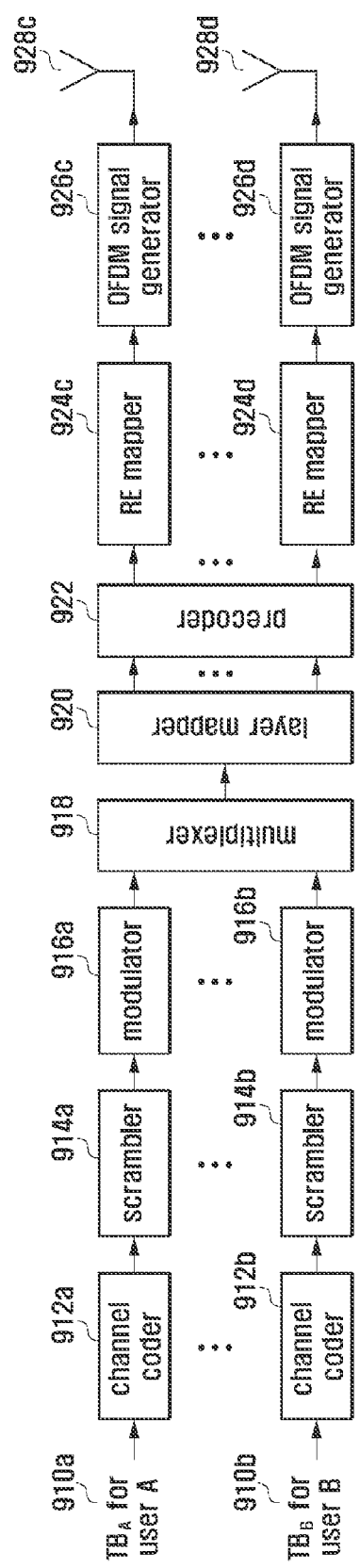
FIG. 9 is a block diagram illustrating a configuration of an LTE eNB transmitter having a multiplexer for supporting downlink fractional RB allocation according to an embodiment of the present invention.

FIG. 9 is a block diagram illustrating a configuration of an LTE eNB transmitter having a multiplexer for supporting downlink fractional RB allocation according to an embodiment of the present invention.

Referring to FIG. 9, TB1 910a as the first data to be transmitted to the first UE of user A and TB2 910b as the second data to be transmitted to the second UE of user B are channel-coded by channel coders 912a and 912b, scrambled by scramblers 914a and 914b, and modulated by modulators 916a and 916b so as to be output as modulation symbol streams. The symbol streams output by modulating the first and second data are multiplexed by a multiplexer 918. Next, the multiplexed modulation signal stream is layer-mapped by a layer mapper 920 and precoded into per-spatial layer modulation symbol streams. In case of SM, the number of CWs is limited to 2 while the number of spatial layers is allowed up to 4. In case of transmit diversity, the number of CWs is 1 while the number of spatial layers is 2 or 4 with the precoding as transmit diversity coding. The precoding can be categorized into one of a transmit diversity coding, open-loop precoding, and closed-loop coding.

A precoder 922 converts the modulation symbol streams per spatial layer to symbol streams to be transmitted through respective antenna ports 928c and 928d. The precoded symbol streams are mapped to REs per antenna port by RE mappers 924c and 924d and converted to OFDM symbols by OFDM signal generators 926c and 926d so as to be transmitted through respective transmit ports 928c and 928d.

Although the description is made under the assumption that the first and second data are transmitted to respective UEs, the present invention is not limited. That is, in case that a UE is configured with at least two receive antennas, the data transmitted through the respective antennas can be discriminated among the first and second data.

The eNB transmitter according to an embodiment of the present invention can be configured by adding the multiplexer 918 to the structure of the conventional eNB transmitter. By adding the multiplexer 918, it is possible to transmits TBs 910a and 910b to different users, instead of two CW transmissions, through SM. Here, the multiplexer 918 is responsible for multiplexing multiple users into an RB.

Since the traffic amount generated by VoIP is not great, the SM operation is excluded for simplifying the explanation. Although FIG. 9 is depicted under assumption that an RB is shared by two UEs for simplicity purpose, it is obvious that the number of UEs sharing an RB can increases if multiple UEs having good channel quality are aggregated.

Since the VoIP traffic is delay-sensitive, the precoding technique is used for transmit diversity. The transmit diversity is the technique to mitigate the influence of fading effect caused by irregular variation of reception electric field in electromagnetic wave environment and includes frequency diversity technique, spatial diversity technique, and transmit diversity technique.

The frequency diversity is the technique to transmit data on the resources located distant enough on the frequency axis. By taking notice of frequency-selective fading, the data transmitted on the resources located far enough on frequency axis experience channel responses with low correlation. In this case, even though the signal transmitted on a resource experience worst channel, the signal transmitted on the other resource is likely not to experience such worst channel. Accordingly, the possibility that the signals transmitted with the frequency diversity technique experiences the worst channel quality decreases.

The spatial diversity is the technique to transmit or receive data through spatially separated antennas. If the distance between antennas are far enough, the channel response correlation between the antennas decreases. Accordingly, even when the signal transmitted through an antenna experience very bad channel, the signal transmitted through the other antenna is likely to experience relatively good channel. In case of using the spatial diversity technique, the probability that all the signals experience very bad channel states decreases.

The transmit diversity is the technique to adopt the spatial diversity to the transmitter. LTE adopts Space Frequency Block Coding (SFBC) for the eNB having two transmit antennas and a combination of SFBC and Frequency Switched Transmit Diversity (FSTD) for the eNB having four transmit antennas. The SFBC technique is to transmit the spatial diversity-coded symbols in contiguous subcarriers rather than the same subcarrier in the contiguous time slots, and FSTD technique is to transmit the symbols extracted from a coded symbol stream while switching between antennas per frequency.

SFBC is the transmit diversity technique for transmitting a pair of modulation symbol streams through two transmit antennas. Formula (1) expresses the SFBC transmission technique.

$$\begin{bmatrix} S_{2k} & S_{2k+1} \\ -S_{2k+1}^* & S_{2k}^* \end{bmatrix} \quad (1)$$

In matrix of formula (1), the columns denote subcarriers on frequency axis, and the rows denotes transmit antennas. That is, the first transmit antenna transmits $\{S_{2k}, S_{2k+1}\}$ on the two congiguous subcarriers $\{-S^*_{2k+1}, S^*_{2k}\}$, and the second transmit antenna transmits on the same subcarriers. In this manner, SFBC applies transmit diversity of the two contiguous subcarriers.

The combination of SFBC and FSTD is the transmit diversity technique for transmitting four contiguous modulation symbol streams $\{S_{2k}, S_{2k+1}, S_{2k+2}, S_{2k+3}\}$ through four transmit antennas. Formula (2) expresses the transmit diversity technique using four transmit antennas.

$$\begin{bmatrix} S_{2k} & S_{2k+1} & 0 & 0 \\ 0 & 0 & S_{2k+2} & S_{2k+3} \\ -S_{2k+1}^* & S_{2k}^* & 0 & 0 \\ 0 & 0 & -S_{2k+3}^* & S_{2k+2}^* \end{bmatrix} \quad (2)$$

In matrix of formula (2), the columns denote subcarriers on frequency axis, and the rows denote transmit antennas. That is, the first transmit antenna transmits $\{S_{2k}, S_{2k+1}\}$ on two contiguous subcarriers, the third transmit antenna transmits $\{-S^*_{2k+1}, S^*_{2k}\}$ on the same subcarriers, the second transmit antenna transmits $\{S_{2k+2}, S_{2k+3}\}$ on two congiguous subcarriers, and the fourth transmit antenna transmits $\{-S^*_{2k+3}, S^*_{2k+2}\}$ on the same subcarriers.

Figure 10:
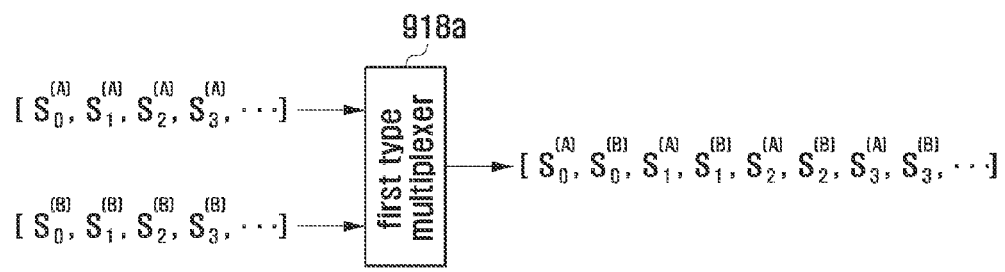
FIG. 10 is a diagram illustrating a configuration of a first type multiplexer supporting fractional RB allocation according to an embodiment of the present invention.

FIG. 10 is a diagram illustrating a configuration of a first type multiplexer supporting fractional RB allocation according to an embodiment of the present invention.

Referring to FIG. 10, $[S_0^{(A)}, \ldots, S_k^{(A)}, \ldots]$ denotes a modulation symbol stream to be transmitted to the first UE, and $[S_0^{(B)}, \ldots, S_k^{(B)}, \ldots]$ denotes a modulation symbol stream to be transmitted to the second UE. These two symbol streams are multiplexed into a multiplex modulation symbol stream $[S_0^{(A)}, S_k^{(B)}, \ldots, S_k^{(A)}, S_k^{(B)}, \ldots]$ by the multiplexer 918a. The first type multiplexer 918a is characterized by multiplexing the modulation symbol streams of individual users alternately.

Figure 11:
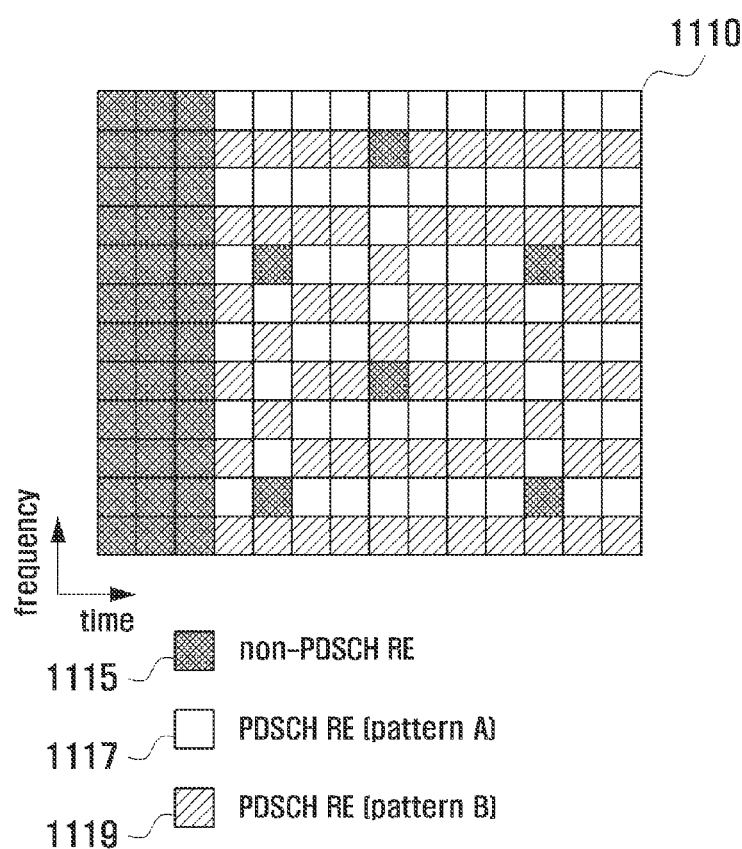
FIG. 11 is a diagram illustrating RE mapping with the use the first type multiplexer according to an embodiment of the present invention.

FIG. 11 is a diagram illustrating RE mapping with the use the first type multiplexer according to an embodiment of the present invention.

In FIG. 11, it is assumed that one transmit antenna is used and the control region is composed of three OFDM symbols at the beginning of the subframe. Accordingly, the REs denoted by reference number 1115 are not used for PDSCH transmission. In LTE downlink, the frequency first mapping scheme is adopted. Accordingly, when the first type multiplexer 918a depicted in FIG. 10 is used, the REs denoted by reference number 1117 are mapped for the first UE, and the REs denoted by reference number 1119 are mapped for the second UE. Meanwhile, the modulation symbols are mapped to the REs in a sequential order jumping the RS REs.

The description has been directed to the modulation symbol mapping method of the eNB having one transmit antenna hereinabove. In case of using one transmit antenna, the signals destined to different UEs are transmitted on the orthogonal frequency and time so as to avoid interference between the UEs.

A description is made of the case where the eNB having two transmit antennas uses SFBC. In this case, the eNB transmits the modulation symbols arranged in the form of matrix (3).

$$\begin{bmatrix} S_k^{(A)} & S_k^{(B)} \\ -\{S_k^{(B)}\}^* & \{S_k^{(A)}\}^* \end{bmatrix} \quad (3)$$

If the UE performs channel estimation without error, the modulation symbols $S_k^{(A)}$ and $S_k^{(B)}$ transmitted to different UEs can be recovered without interference to each other. However, an error occurs in the channel estimation, interference takes place between the UEs. Such interference may take place due to the channel estimation error even when the UEs are not multiplexed. If there is a large difference in power between the first and second UEs, the signal of the UE allocated relatively high power interferes the signal of the UE allocated relatively low power.

Figure 12:
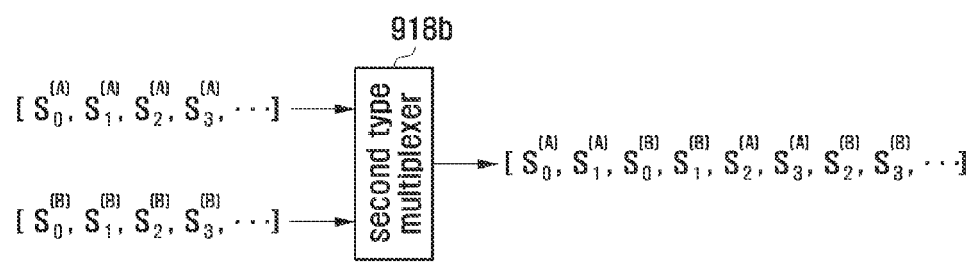
FIG. 12 is a block diagram illustrating a configuration of a second type multiplexer according to an embodiment of the present invention.

FIG. 12 is a block diagram illustrating a configuration of a second type multiplexer according to an embodiment of the present invention.

Referring to FIG. 12, $[S_0^{(A)}, S_1^{(A)}, \ldots]$ is a modulation symbol stream to be transmitted to the first UE, and $[S_0^{(B)}, S_1^{(B)}, \ldots]$ is a modulation symbol stream to be transmitted to the second UE. These two symbol streams are multiplexed into a multiplex symbol stream $[S_0^{(A)}, S_1^{(A)}, S_0^{(B)}, S_1^{(B)}, \ldots]$ by the multiplexer 918b.

The second type multiplexer 918b can multiplex modulation symbols of each UE in pairs alternately. That is, the second type multiplexer 918b is characterized by grouping the modulation symbols of each UE in unit of two contiguous symbols and multiplexing the groups alternately. In this way, SFBC is applied to the modulation symbols of the same UE so as to avoid interference between UEs.

Figure 13:
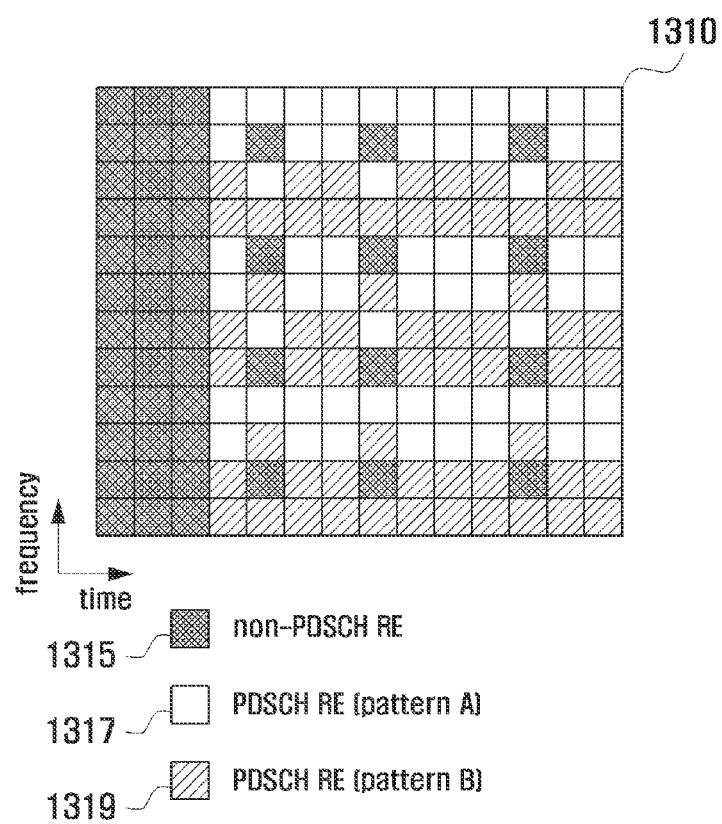
FIG. 13 is a diagram illustrating RE mapping with the use the second type multiplexer in the eNB using two transmit antennas according to an embodiment of the present invention.

FIG. 13 is a diagram illustrating RE mapping with the use the second type multiplexer in the eNB using two transmit antennas according to an embodiment of the present invention.

Referring to FIG. 13, the control region is composed of the first three OFDM symbols of the subframe. Accordingly, the REs designated by reference number 1315 are not used for PDSCH transmission in RB 1310. Since the frequency first mapping scheme is adopted in LTE downlink, if the second type multiplexer 918b of FIG. 12 is used, the REs denoted by reference number 1317 are mapped for the first UE, and the REs denoted by reference number 1319 are mapped for the second UE. The second type multiplexer 918b of FIG. 12 can be applied for single transmit antenna transmission.

Figure 14:
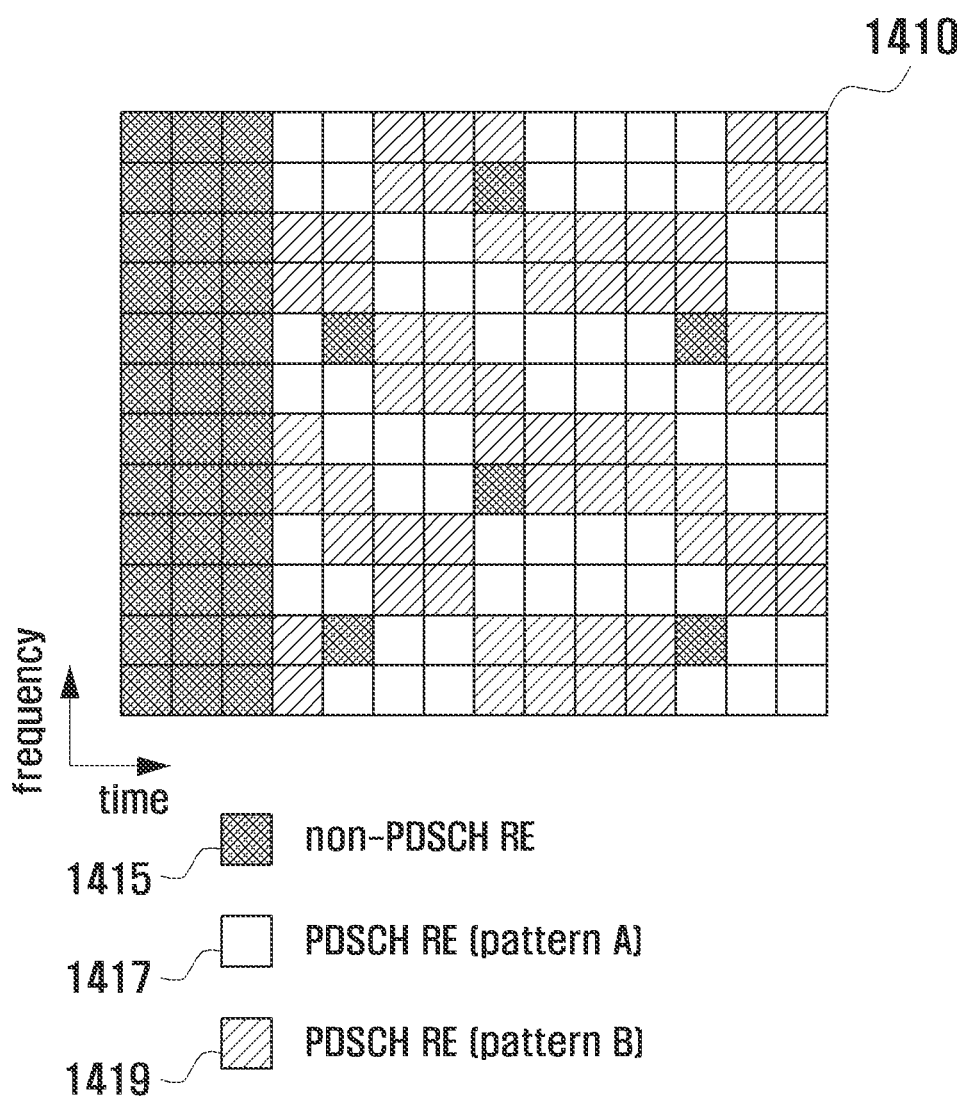
FIG. 14 is a diagram illustrating RE mapping with the use the second type multiplexer in the eNB using a single transmit antenna according to an embodiment of the present invention.

FIG. 14 is a diagram illustrating RE mapping with the use the second type multiplexer in the eNB using a single transmit antenna according to an embodiment of the present invention.

Referring to FIG. 14, under the assumption of the control region composed of the first three OFDM symbols, the REs designated by reference number 1415 are not used for PDSCH transmission in RB 1410. Assuming the frequency first mapping, the REs denoted by reference number 1417 are mapped for the first UE, and the REs denoted by reference number 1419 are mapped for the second UE. As shown in FIG. 14, the number of the REs 1417 mapped for the first UE is greater by 2 than the number of the REs 1419. This is because the condition that, when using the second type multiplexer 918b, the number of REs for PDSCH transmission should be a multiple of 4 for allocating the same amount of resource to the users is not fulfilled always. In order to achieve fair resource allocation between the users, it can be considered to change the multiplexing order at every transmission.

For example, the second type multiplexer 918b of FIG. 12 can arrange the REs 1417 for the first UE prior to the REs 1419 for the second UE at odd-numbered transmissions and the REs 1419 for the second UE prior to the REs 1417 for the first UE at even-numbered transmissions. By taking notice of a large number of transmission durations, it is possible to expect fair resource allocation between the UEs.

Figure 15:
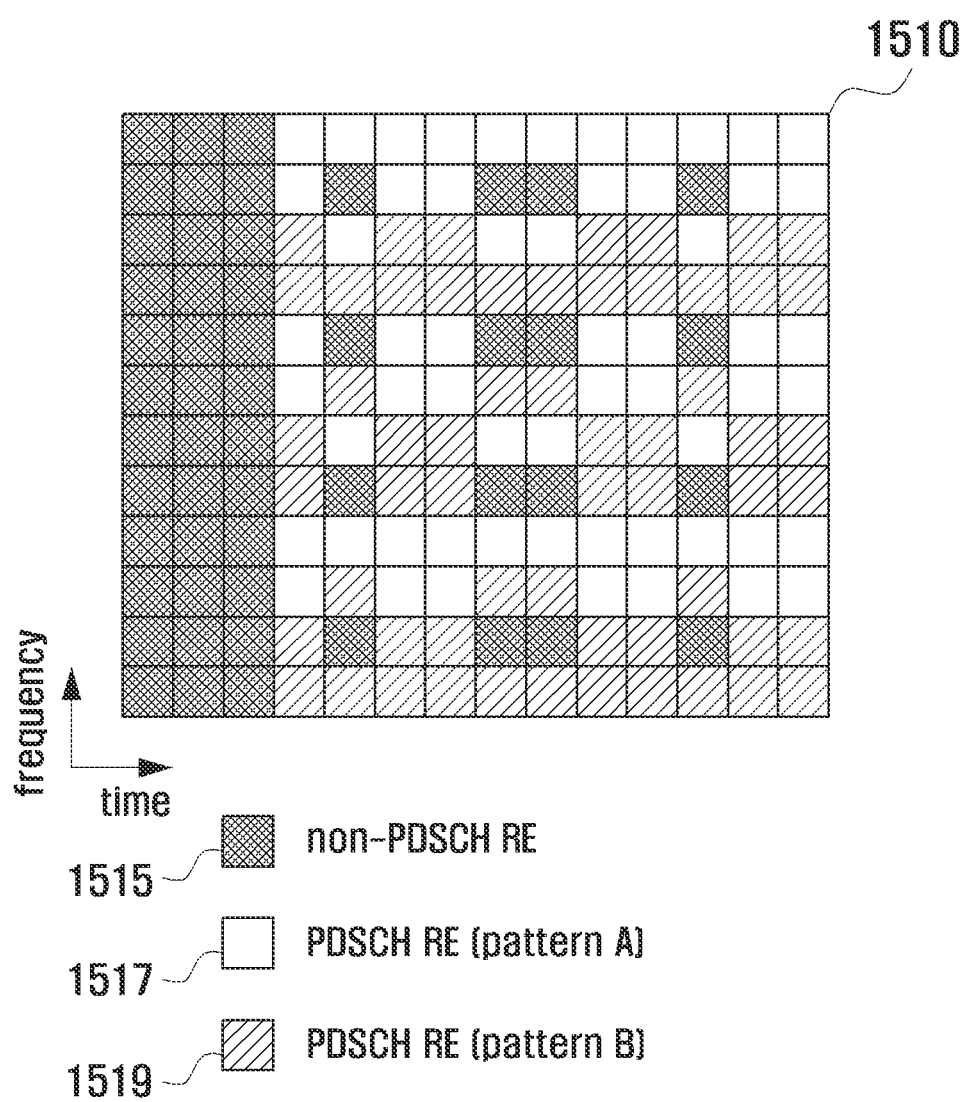
FIG. 15 is a diagram illustrating RE mapping with the use the second type multiplexer in the eNB using four transmit antennas according to an embodiment of the present invention.

FIG. 15 is a diagram illustrating RE mapping with the use the second type multiplexer in the eNB using four transmit antennas according to an embodiment of the present invention.

Referring to FIG. 15, under the assumption of the control region composed of the first three OFDM symbols, the REs designated by reference number 1515 are not used for PDSCH transmission in RB 1510. Assuming the frequency first mapping, the REs denoted by reference number 1517 are mapped for the first UE, and the REs denoted by reference number 1519 are mapped for the second UE.

In case that the eNB using four transmit antennas adopts the combination of SFBC and FSTD for the transmit diversity, the transmission can be performed in the form of matrix (4).

$$\begin{bmatrix} S_{2k}^{(A)} & S_{2k+1}^{(A)} & 0 & 0 \\ 0 & 0 & S_{2k}^{(B)} & S_{2k+1}^{(B)} \\ -\{S_{2k+1}^{(A)}\}^* & \{S_{2k}^{(A)}\}^* & 0 & 0 \\ 0 & 0 & -\{S_{2k+1}^{(B)}\}^* & \{S_{2k}^{(B)}\}^* \end{bmatrix} \quad (4)$$

That is, the first UE always UEs the first and third transmit antennas while the second UE uses the second an fourth transmit antennas. In this case, there is no interference between the user but the diversity order is limited to 2.

Figure 16:
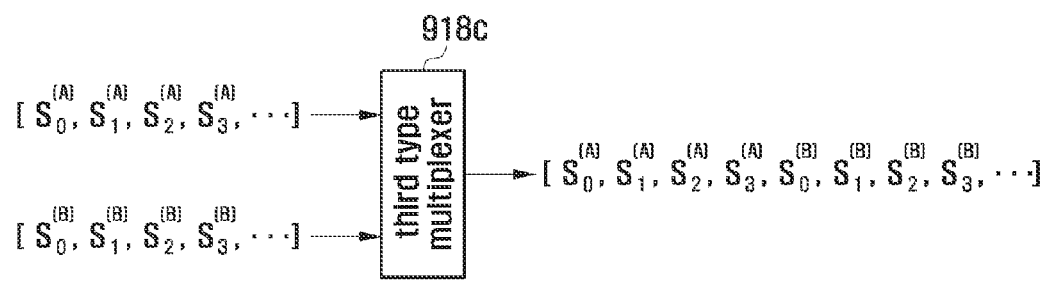
FIG. 16 is a block diagram illustrating a configuration of a third type multiplexer for supporting fractional RB allocation according to an embodiment of the present invention.

FIG. 16 is a block diagram illustrating a configuration of a third type multiplexer for supporting fractional RB allocation according to an embodiment of the present invention.

Referring to FIG. 16, $[S_0^{(A)}, S_1^{(A)}, S_2^{(A)}, S_3^{(A)}, \ldots]$ is the modulation symbol stream to be transmitted to the first UE, and $[S_0^{(B)}, S_1^{(B)}, S_2^{(B)}, S_3^{(B)}, \ldots]$ is the modulation symbol stream to be transmitted to the second UE. These two symbol streams are multiplexed into $[S_0^{(A)}, S_1^{(A)}, S_2^{(A)}, S_3^{(A)}, S_0^{(B)}, S_1^{(B)}, S_2^{(B)}, S_3^{(B)}, \ldots]$ by the third type multiplexer 918c.

The third type multiplexer 918c is characterized by multiplexing in unit of four continuous modulation symbols for the respective UEs alternately. With this scheme, the transmit diversity of combination of SFBC and FSTD are applied to the modulation symbols for the same UE so as to maintain the diversity order of 4.

Figure 17:
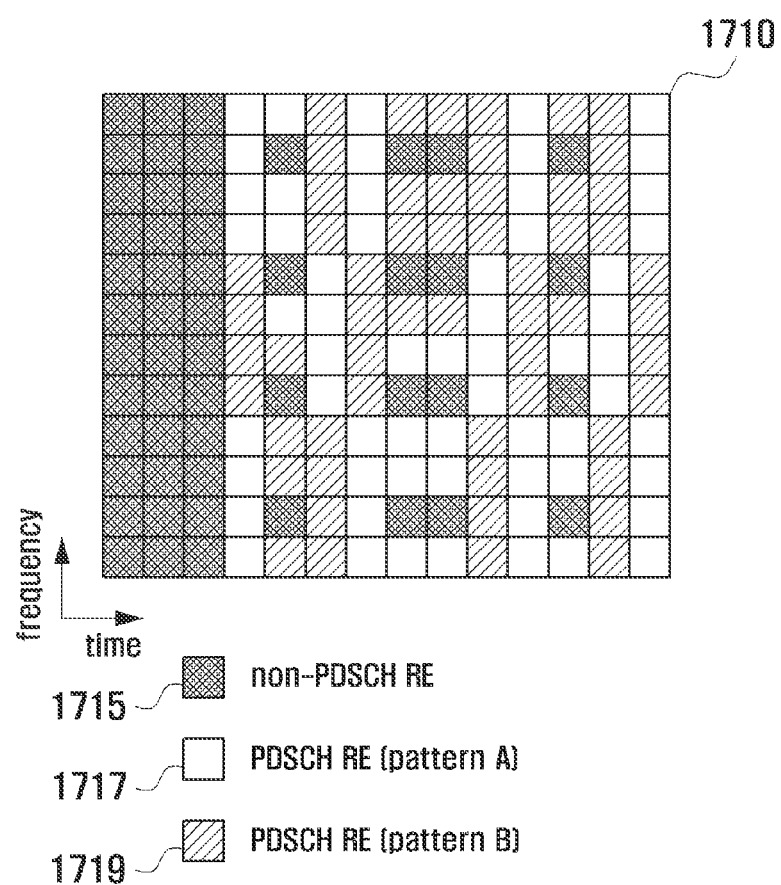
FIG. 17 is a diagram illustrating RE mapping with the use the third type multiplexer in the eNB using four transmit antennas according to an embodiment of the present invention.

FIG. 17 is a diagram illustrating RE mapping with the use the third type multiplexer in the eNB using four transmit antennas according to an embodiment of the present invention.

Referring to FIG. 17, under the assumption of the control region composed of the first three OFDM symbols, the REs designated by reference number 1715 are not used for PDSCH transmission in RB 1710. Assuming the frequency first mapping adopted in LTE downlink, with the use of the third type multiplexer 918c, the REs denoted by reference number 1717 are mapped for the first UE, and the REs denoted by reference number 1719 are mapped for the second UE.

According to the embodiment of FIG. 17, the number of REs 1717 for the first UE is greater by 4 than the number of REs 1719 for the second UE. This is because the condition that, with the third type multiplexer 918c, the number of REs for PDSCH transmission should be a multiple of 8 for allocating the same amount of resource to the users is not fulfilled always. In order to achieve fair resource allocation between the users, it can be considered to change the multiplexing order at every transmission.

For example, the third type multiplexer 918c of FIG. 16 arranges the REs 1717 for the first UE prior to the REs 1719 for the second UE at odd-number transmissions as $[S_0^{(A)}, S_1^{(A)}, S_2^{(A)}, S_3^{(A)}, S_0^{(B)}, S_1^{(B)}, S_2^{(B)}, S_3^{(B)}, \ldots]$ and the REs 1719 for the second UE prior to the REs 1717 for the first UE at even-numbered transmissions as $[S_0^{(A)}, S_1^{(A)}, S_2^{(A)}, S_3^{(A)}, S_0^{(B)}, S_1^{(B)}, S_2^{(B)}, S_3^{(B)}, \ldots]$. By taking notice of a large number of transmission durations, it is possible to expect fair resource allocation between the UEs with this scheme.

Figure 18:
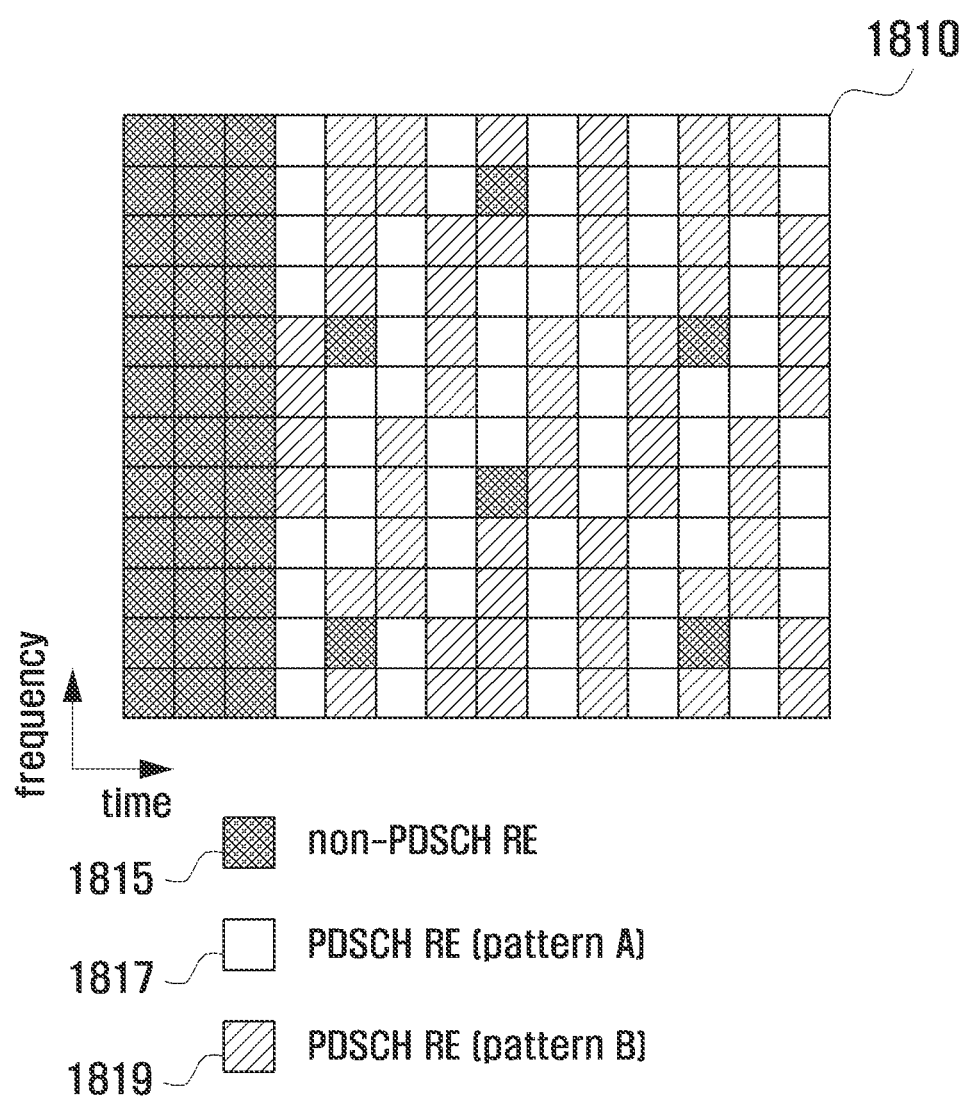
FIG. 18 is a diagram illustrating RE mapping with the use the third type multiplexer in the eNB using one transmit antennas according to an embodiment of the present invention.

FIG. 18 is a diagram illustrating RE mapping with the use the third type multiplexer in the eNB using one transmit antennas according to an embodiment of the present invention.

Referring to FIG. 18, under the assumption of the control region composed of the first three OFDM symbols, the REs designated by reference number 1815 are not used for PDSCH transmission in RB 1810. Assuming the frequency first mapping adopted in LTE downlink, the REs denoted by reference number 1817 are mapped for the first UE, and the REs denoted by reference number 1819 are mapped for the second UE. According to the embodiment of FIG. 18, the number of REs 1817 for the first UE is greater by 2 than the number of REs 1819 for the second UE. With the use of multiplexing order change scheme, it is possible to achieve fair resource allocation between the users.

Figure 19:
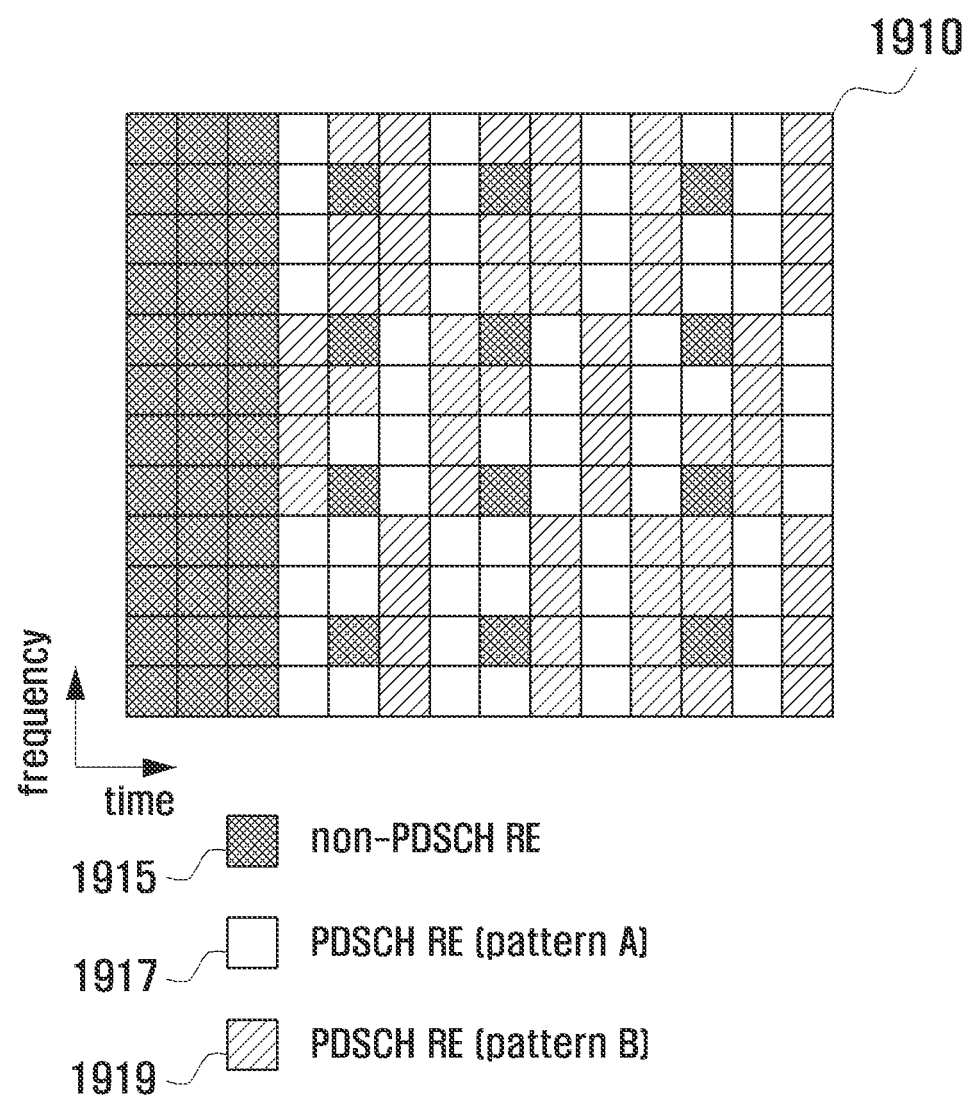
FIG. 19 is a diagram illustrating RE mapping with the use the third type multiplexer in the eNB using 2 transmit antennas according to an embodiment of the present invention.

FIG. 19 is a diagram illustrating RE mapping with the use the third type multiplexer in the eNB using 2 transmit antennas according to an embodiment of the present invention.

Referring to FIG. 19, under the assumption of the control region composed of the first three OFDM symbols, the REs designated by reference number 1915 are not used for PDSCH transmission in RB 1910. Assuming the frequency first mapping adopted in LTE downlink, the REs denoted by reference number 1917 are mapped for the first UE, and the REs denoted by reference number 1919 are mapped for the second UE.

With such fractional RB allocation scheme, the multiplexer can multiplex a plurality of users into a single RB. Referring to RE arrangements of FIGS. 11, 13, 14, 15, 17, 18, and 19, it is noted that the fractional RB allocation can be implemented even through the RE arrangement is modified.

Figure 20:
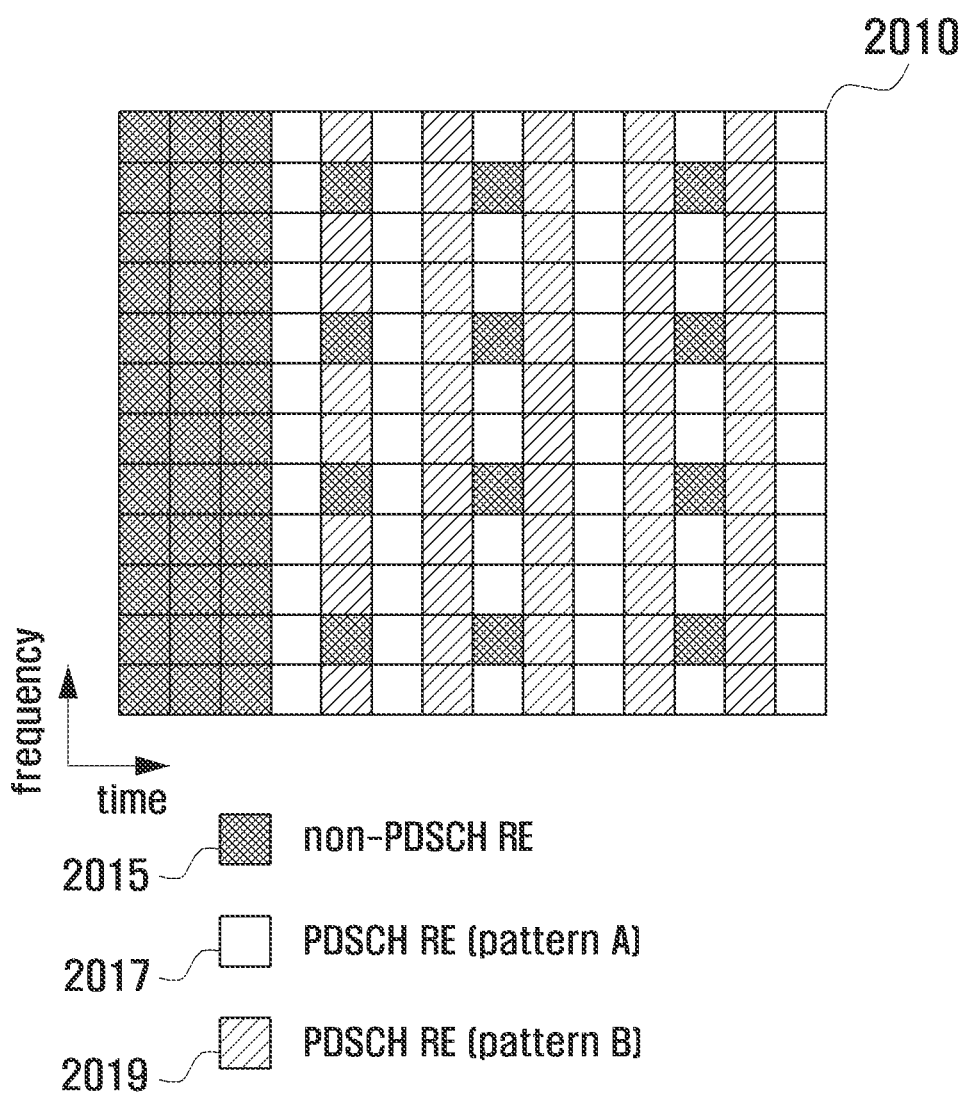
FIG. 20 is a diagram illustrating a principle of RE mapping of an LTE transmitter according to an embodiment of the present invention.

FIG. 20 is a diagram illustrating a principle of RE mapping of an LTE transmitter according to an embodiment of the present invention.

In the embodiment of FIG. 20, the users are mapped to different OFDM symbols on time axis in TDM (Time Division Multiplexing) manner. TDM is to allocate resource in unit of SC-FDMA symbol on time axis.

In RB 2010, the $4^{th}$, $6^{th}$, $8^{th}$, $10^{th}$, $12^{th}$, and $14^{th}$ OFDM symbols are configured with the REs 2017 for the first UE. The $5^{th}$, $7^{th}$, $9^{th}$, $11^{th}$, and $13^{th}$ OFDM symbols are configured with the REs 2019 for the second UE. If the REs are arranged on frequency axis in the same manner, the FDM (Frequency Division Multiplexing) is adopted.

Figure 21:
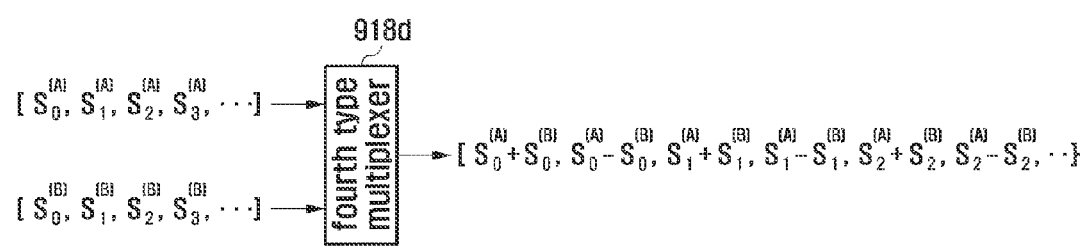
FIG. 21 is a block diagram illustrating a configuration of a fourth type multiplexer for supporting fractional RB allocation according to an embodiment of the present invention.

FIG. 21 is a block diagram illustrating a configuration of a fourth type multiplexer for supporting fractional RB allocation according to an embodiment of the present invention.

Referring to FIG. 21, the fourth multiplexing scheme is characterized in that the fourth type multiplexer 918d performs CDM (Code Division Multiplexing). CDM is characterized by spreading a plurality of modulation symbol streams are spread by different codes such that the resources are allocated on code axis.

It is assumed that $[S_0^{(A)}, S_1^{(A)}, \ldots]$ is the modulation symbol stream to be transmitted to the first UE, and $[S_0^{(B)}, S_1^{(B)}, \ldots]$ is the modulation symbol stream to be transmitted to the second UE. These two symbol streams are multiplexed into $[S_0^{(A)}+S_0^{(B)}, S_0^{(A)}-S_0^{(B)}, S_1^{(A)}+S_1^{(B)}, S_1^{(A)}-S_1^{(B)}, \ldots]$ by the multiplexer 918d corresponding to a 2×2 Walsh-Hadamard transformer. Since the main object to secure the orthogonality among the codes in the modulation symbol transformation at the fourth type multiplexer 918d, it is possible to apply a certain orthogonal unitary transform rather than Wash-Hadamard transformation.

With the use of this CDM scheme, it is possible to avoid the interference between users that may be caused by application of the fourth type multiplexing scheme to the eNB using multiple antennas. In CDM, since all of the PDSCH REs are mapped for the signals of one UE, it is not necessary to map the user signal to the REs in different patterns for respective uses.

Figure 22:
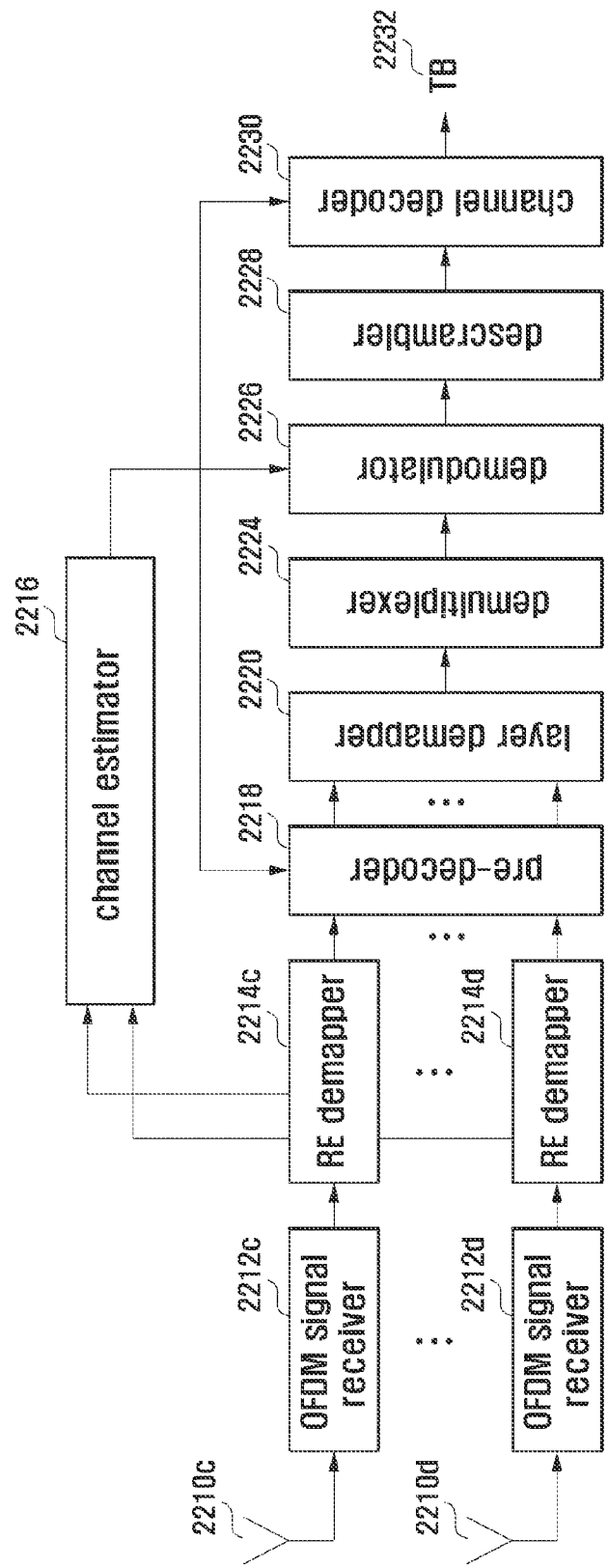
FIG. 22 is a block diagram illustrating a configuration of a UE receiver supporting the fractional RB allocation with a multiplexer according to an embodiment of the present invention.

FIG. 22 is a block diagram illustrating a configuration of a UE receiver supporting the fractional RB allocation with a multiplexer according to an embodiment of the present invention.

Although FIG. 22 is depicted under the assumption of the configuration of the UE having multiple receive antennas, the present invention can be applied when the UE has a single receive antenna. In case that the UE has one transmit antenna, it can be implemented only one OFDM receiver and one RE demapper. The signals received by the receive antennas 2210c and 2210d of the receiver processed by the OFDM receivers 2212c and 2212d so as to be converted to baseband signals. The converted signal is delivered to the channel estimator 2216 via the RE demappers 2214c and 2214d for extracting resource allocation indication signal, and the signal mapped to PDSCH REs are delivered to the pre-decoder 2218.

In case that the precoding is applied for the transmit diversity, the pre-decoder 2218 is a transmit diversity receiver. Since the pre-decoder 2218 needs channel response, it receives channel response estimation value from the channel estimator 2216.

The pre-decoded signal is demapped by a layer demapper 2220 so as to be recovered as multiplexed modulation symbol streams. The multiplexed modulation symbol streams are demultiplexed by a demultiplexer 2224 so as to extract only the modulation symbols destined to the receiver. If fractional RB allocation is not applied, the extraction process at the demultiplexer 2224 is skipped. The extracted user modulation symbol stream is processed by a descrambler 2228 and a channel decoder 2230 in sequence so as to be recovered as TB 2232. Here, since both the demodulator 2226 and the channel decoder 2230 receives the channel response estimation value from the channel estimator 2216.

In case that the fractional RB allocation is performed by changing RE arrangement rather than multiplexing, the extraction process performed by the multiplexer 2224 is skipped, and the modulation symbols destined to the UE are extracted by RE demappers 2214c and 2214d.

In order to support downlink fractional RB allocation according to an embodiment of the present invention, one a multiplexing-based method and a RB arrangement modification-based method can be used. Discussions have been done about the problems that may occur according to the multiplexing scheme and the number of eNB's transmit antennas. Descriptions are made of the embodiments in which the fractional RB allocation is implemented with multiplexing technique.

First Embodiment

The first embodiment relates to the method for applying the first type multiplexing scheme regardless of the number of transmit antennas as described with reference to FIG. 10. In this method, interference may occur between UEs when the number of transmit antennas is 2 or 4. However, it is possible to maintain a specific multiplexing scheme regardless of the number of eNB's transmit antennas and achieve fair resource allocation to the two UEs with the fractional RB allocation in a subframe.

Second Embodiment

The second embodiment relates to the method for applying the second type multiplexing scheme regardless of the number of transmit antennas as described with reference to FIG. 12. This method guarantees no interference between the UEs and allows maintaining a specific multiplexing scheme regardless of the number of eNB's transmit antennas, however, the diversity order is limited to 2 when the number of eNB's transmit antennas is 4.

Third Embodiment

The third embodiment relates to the method for applying the third type multiplexing scheme regardless of the number of transmit antennas as described with reference to FIG. 16. This method guarantees no interference between the UEs and allows maintaining a specific multiplexing scheme regardless of the number of eNB's transmit antennas. Also, this method is characterized in that the diversity order of 4 can be maintained even when the number of eNB's transmit antennas I 4.

Fourth Embodiment

The fourth embodiment relates to the method for applying the fourth type multiplexing scheme regardless of the number of transmit antennas as described with reference to FIG. 21. This method may cause interference between UEs but can maintain a specific multiplexing scheme regardless of the number of eNB's transmit antennas. Also, this method is characterized by fair resource allocation to the UEs with fractional RB allocation in a subframe.

Fifth Embodiment

The fifth embodiment relates to the method for applying different multiplexing schemes depending on the number of transmit antennas of the eNB. This method apply the first multiplexing scheme for the case of using one transmit antenna, second multiplexing scheme for the case of using two transmit antennas, and third multiplexing scheme for the case of using four transmit antennas. With this method, no interference takes place between the UEs.

Sixth Embodiment

The sixth embodiment relates to the method for supporting the fractional RB allocation without change of the RE arrangement as described with reference to FIG. 20 with no introduction of new multiplexing scheme. Although this causes no interference between the users and a predetermined arrangement rule can be applied regardless of the number of eNB's transmit antennas, fair resource allocation between the users is not guaranteed.

The above-described embodiments can be applied to the case where dedicated RS is defined. A description is made of signaling between eNB and UE for implementing these embodiments hereinafter.

Figure 23:
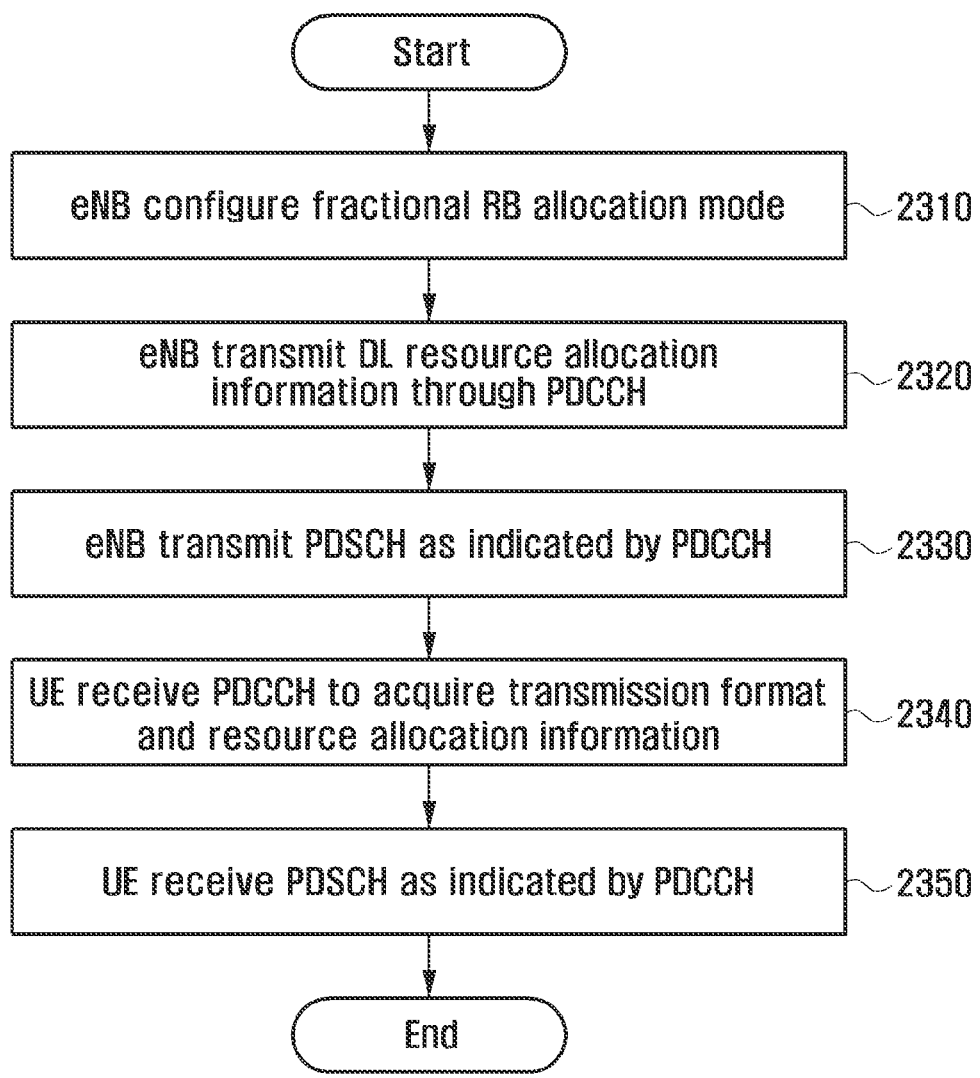
FIG. 23 is a flowchart illustrating a method of downlink fractional RB allocation according to an embodiment of the present invention.

FIG. 23 is a flowchart illustrating a method of downlink fractional RB allocation according to an embodiment of the present invention.

Referring to FIG. 23, the eNB configures the fractional RB allocation mode for a VoIP UE having good channel state at step 2310. Next, the eNB transmits downlink resource allocation information in PDCCH at step 2320. In the fractional RB allocation mode, the eNB transmits PDCCH designed to support the fraction RB allocation or interpret PDCCH under the assumption of fractional RB allocation. For this purpose, the PDCCH can be interpreted as follows.

The first method is to modify the structure of PDCCH to notify explicitly which fractional RB is allocated. It is assumed that the fractional RB is defined so as to allocate resources for K UEs in an RB. If the number of downlink RBs is $N_{RB}$, the eNB uses $\log_2 (K \times N_{RB})$ as RB allocation field so as to notify the UE of the allocated multiplexing pattern explicitly. Also, it is possible to notify the UE of the allocated RB and multiplexing pattern in the RB allocation field by adding a new field of $\log_2 (K)$ bits. In order to discriminate among K multiplexing patterns and the case with no fractional RB application, the eNB can use $\log_2 ((K+1) \times N_{RB})$ bits for the RB allocation field or add a new field of $\log_2 (K+1)$ bits while maintaining the conventional PDCCH.

The second method is to interpret the conventional PDCCH in different rule without modifying the configuration of PDCCH. In case that the VoIP UE is allocated a higher order MCS, the eNB interprets this as fractional RB allocation and notifies of the multiplexing pattern with bits of a field. Since the VoIP UE has low decoding burden, the eNB may use blink decoding in association with resource allocation. For example, the UE attempts decoding with the assumption of every case without explicit notification on the situation such as the case of using an RB entirely, case of using pattern A, and case of using Pattern B. In case of depending on the blind decoding, if the pattern can be changed at every transmission by taking notice of HARQ process, it is necessary to increases the size of soft buffer for storing the values used in decoding as much as the combination of the patterns.

Next, the eNB transmits PDSCH to the UE as indicated in PDCCH at step 2330. The UE receives PDCCH to acquire transmission format and resource allocation information at step 2340. Next, the UE receives PDSCH using the acquired transmission format and resource allocation information at step 2350.

Until now, the eNB's resource allocation method has been explained. A description is made of the resource allocation method for data transmission from the UE to the eNB.

Since the UE is a transmitter in LTE uplink, the multiplexing of the UEs are not performed by the transmitter. Accordingly, it is a condition of uplink fraction RB allocation for the eNB to allocate the resources orthogonal between UEs without defying the features of SC-FDMA.

Figure 24:
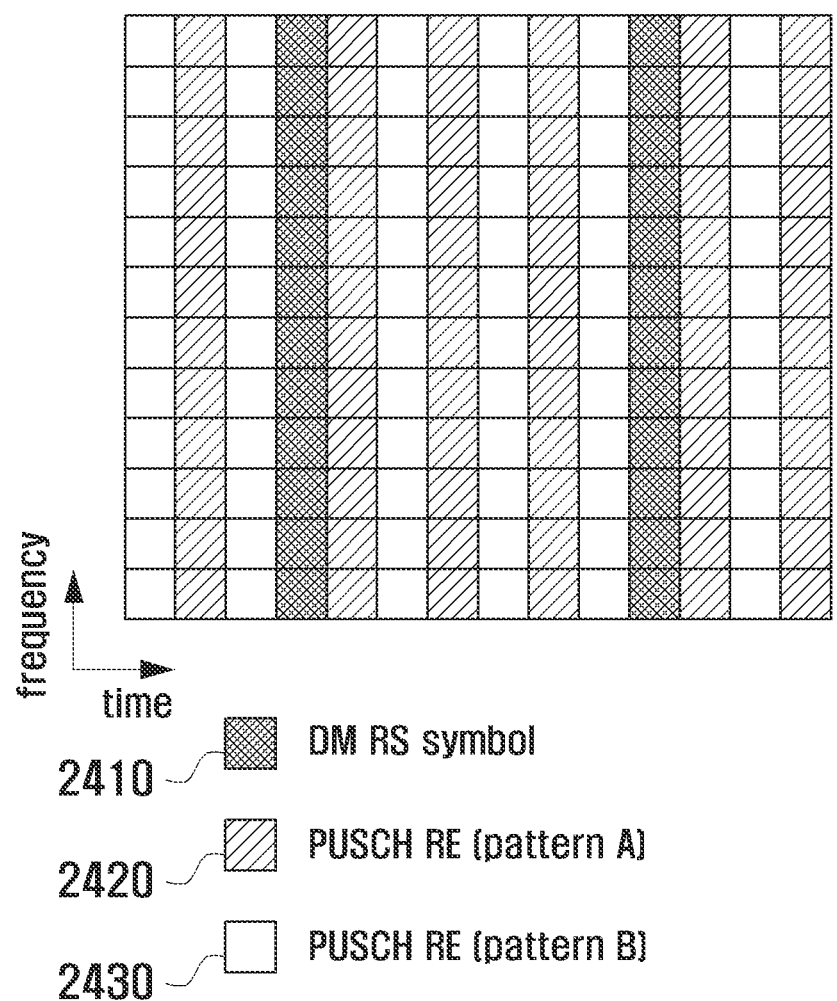
FIG. 24 is a diagram illustrating a principle of uplink fractional RB allocation method according to the first embodiment of the present invention.

FIG. 24 is a diagram illustrating a principle of uplink fractional RB allocation method according to the first embodiment of the present invention.

Referring to FIG. 24, the resources orthogonal between the users are defined as different SC-FDMA symbols. Reference number 2410 denotes REs designated for dedicated RS, reference number 2420 denotes PUSCH REs for the first UE, and reference number 2430 denotes PUSCH REs for the second UE. The PUSCH REs 2420 and 2430 for the first and second UEs are arranged on time axis. The RE mapping is performed by the RE mapper in UE transmitter and RE demapper in eNB receiver.

Figure 25:
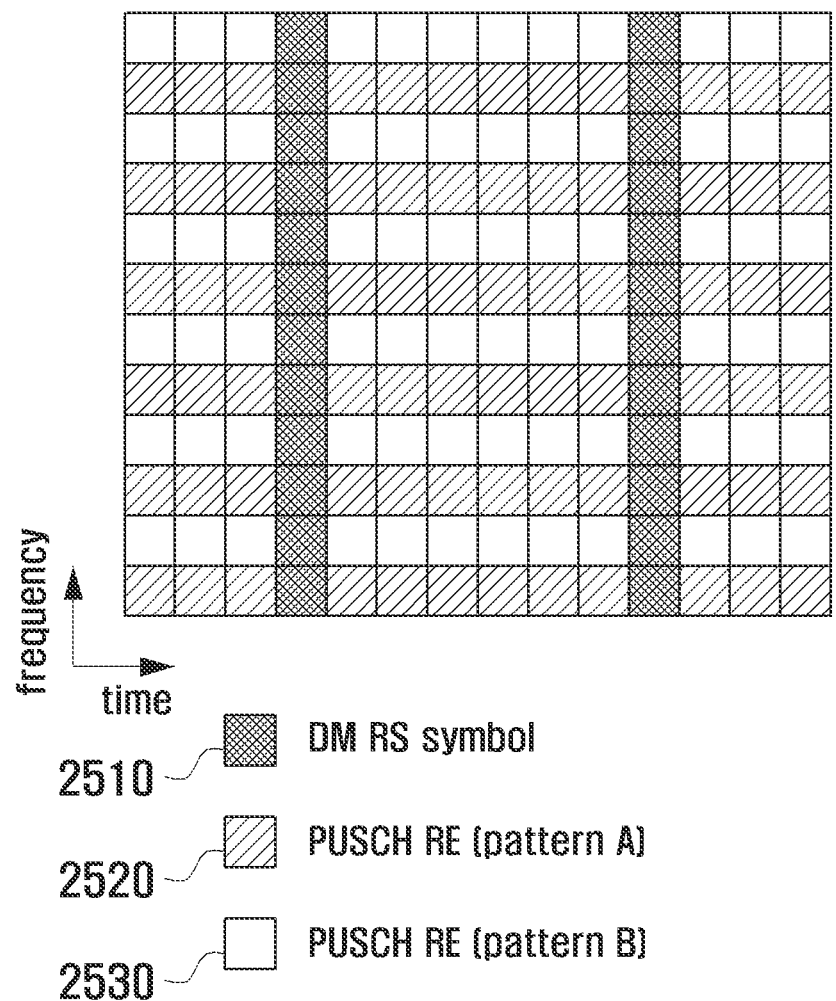
FIG. 25 a diagram illustrating a principle of uplink fractional RB allocation method according to the second embodiment of the present invention.

FIG. 25 a diagram illustrating a principle of uplink fractional RB allocation method according to the second embodiment of the present invention.

Referring to FIG. 25, the resources orthogonal between the UEs are defined as different REs. Reference number 2510 denotes REs designated for dedicated RSs, reference number 2520 denotes PUSCH REs for the first UE, and reference number 2530 denotes PUSCH REs for the second UE. The PUSCH REs 2420 and 2430 for the first and second UEs are arranged on frequency axis. Since the SC-FDMA condition should be satisfied, the REs for a UE are arranged at the same interval. Accordingly, the RE mapping is performed by the RE mapper in UE transmitter and RE demapper in eNB receiver.

Figure 26:
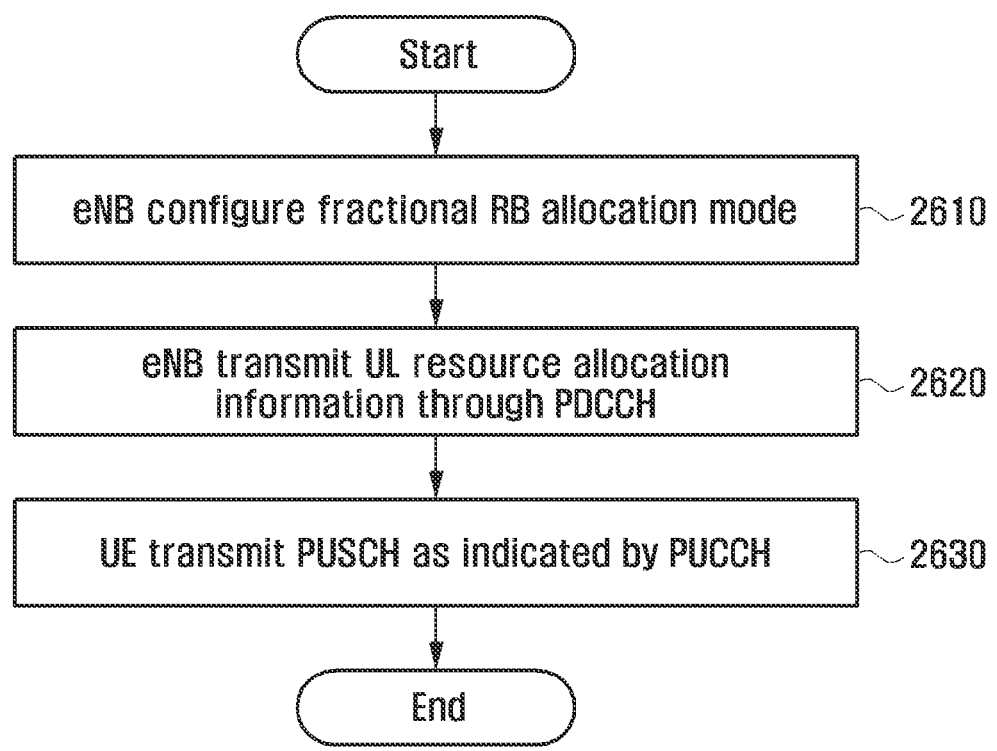
FIG. 26 is a flowchart illustrating a method of uplink fractional RB allocation according to an embodiment of the present invention.

FIG. 26 is a flowchart illustrating a method of uplink fractional RB allocation according to an embodiment of the present invention.

Referring to FIG. 26, the eNB configures fractional RB allocation mode for the VoIP UE having good channel condition as in downlink at step 2610. Next, the eNB transmits the uplink resource allocation information in PDCCH to the UE at step 2620. At this time, the eNB transmits PDCCH designed to support fractional RB allocation in the fractional RB allocation mode as in downlink or interprets PDCCH under the assumption of fractional RB allocation. Finally, the UE transmits PUSCH as indicated in PDCCH at step 2630. That is, if fractional RB is allocated through PDCCH, the UE transmits PUSCH with the application of fractional RB allocation.

Although the description has been made with reference to particular embodiments, the present invention can be implemented with various modification without departing from the scope of the present invention. Thus, the present invention is not limited to the particular embodiments disclosed but will include the following claims and their equivalents.

What is claimed is:

1. A method in a wireless communication system, the method comprising:
generating modulation symbol streams by performing channel coding and modulation for information associated with a first user and a second user;
multiplexing the modulation symbol streams alternately; and
transmitting the multiplexed modulation symbol streams as mapped to a corresponding resource.

2. The method of claim 1, wherein the modulation symbol streams are multiplexed in unit continuous modulation symbols of a predetermined size.

3. The method of claim 1, wherein the multiplexing of the modulation symbol streams comprises grouping the modulation symbol streams of each of the first user and the second user.

4. The method of claim 3, wherein the multiplexing of the modulation symbol streams comprises grouping the modulation symbol streams in unit of four continuous modulation symbols.

5. The method of claim 1, wherein the multiplexing of the modulation symbol streams comprises allocating the modulation symbol streams in unit of 4 resource elements (REs) in a resource block (RB).

6. The method of claim 1, further comprising:
mapping the modulation symbol streams to the resource in an increasing order of frequency first.

7. The method of claim 1, further comprising:
mapping the modulation symbol streams to the resource except for a resource element carrying a reference signal for demodulation of the information.

8. The method of claim 1, wherein the multiplexing of the modulation symbol streams comprises selecting one of a transmit diversity scheme, a time division multiplexing scheme, a frequency division multiplexing scheme, and a code division multiplexing scheme for multiplexing the modulation symbols.

9. The method of claim 1, further comprising:
transmitting information on downlink resource allocation to each of the first user and the second user.

10. An apparatus in a wireless communication system, the apparatus comprising:
at least one processor configured:
to generate modulation symbol streams by performing channel coding and modulation for information associated with a first user and a second user;
to multiplex the modulation symbol streams alternately; and
to transmit the multiplexed modulation symbol streams as mapped to a corresponding resource.

11. The apparatus of claim 10, wherein the modulation symbol streams are multiplexed in unit continuous modulation symbols of a predetermined size.

12. The apparatus of claim 10, wherein the at least one processor is further configured to group the modulation symbol streams of each of the first user and the second user.

13. The apparatus of claim 12, wherein the at least one processor is further configured to group the modulation symbol streams in unit of four continuous modulation symbols.

14. The apparatus of claim 10, wherein the at least one processor is further configured to allocate the modulation symbol streams in unit of 4 resource elements (REs) in a resource block (RB).

15. The apparatus of claim 10, wherein the at least one processor is further configured to map the modulation symbol streams to the resource in an increasing order of frequency first.

16. The apparatus of claim 10, wherein the at least one processor is further configured to map the modulation symbol streams to the resource except for a resource element carrying a reference signal for demodulation of the information.

17. The apparatus of claim 10, wherein the at least one processor is further configured to select one of a transmit diversity scheme, a time division multiplexing scheme, a frequency division multiplexing scheme, and a code division multiplexing scheme for multiplexing the modulation symbols for the multiplexing.

18. The apparatus of claim 10, wherein the at least one processor is further configured to transmit information on downlink resource allocation to each of the first user and the second user.

* * * * *